(12) United States Patent
Mahrt

(10) Patent No.: US 12,557,725 B2
(45) Date of Patent: Feb. 24, 2026

(54) AGRICULTURAL MACHINE CONTROL BASED ON CORRECTED OR LOCALIZED DATA SAMPLE VALUES

(71) Applicant: Deere & Company, Moline, IL (US)

(72) Inventor: Sean A. Mahrt, Le Claire, IA (US)

(73) Assignee: DEERE & COMPANY, Moline, IL (US)

( * ) Notice: Subject to any disclaimer, the term of this patent is extended or adjusted under 35 U.S.C. 154(b) by 192 days.

(21) Appl. No.: 18/502,592

(22) Filed: Nov. 6, 2023

(65) Prior Publication Data

US 2024/0164242 A1 May 23, 2024

Related U.S. Application Data

(60) Provisional application No. 63/383,587, filed on Nov. 14, 2022.

(51) Int. Cl.
*A01B 79/00* (2006.01)
*A01D 41/127* (2006.01)
*G05D 1/00* (2006.01)

(52) U.S. Cl.
CPC .......... *A01B 79/005* (2013.01); *A01D 41/127* (2013.01); *G05D 1/0278* (2013.01)

(58) Field of Classification Search
CPC .... A01B 79/005; A01B 76/00; A01D 41/127; G05D 1/0278
USPC .......................................................... 701/50
See application file for complete search history.

(56) References Cited

U.S. PATENT DOCUMENTS

| | | | | | |
|---|---|---|---|---|---|
| 6,029,106 A | * | 2/2000 | Hale | ................... | A01B 79/005 |
| | | | | | 342/357.62 |
| 2017/0094889 A1 | * | 4/2017 | Garner | ................... | A01C 7/206 |
| 2017/0094894 A1 | * | 4/2017 | Heim | .................... | A01C 5/064 |
| 2018/0042171 A1 | * | 2/2018 | Maro | .................... | A01C 7/205 |
| 2020/0037519 A1 | | 2/2020 | Wonderlich et al. | | |
| 2021/0004594 A1 | | 1/2021 | Dai | | |
| 2021/0127562 A1 | * | 5/2021 | Wonderlich | ............. | A01C 7/16 |

FOREIGN PATENT DOCUMENTS

| | | | |
|---|---|---|---|
| CA | 2240057 C | | 1/2001 |
| EP | 3165065 | | 5/2017 |
| EP | 3326440 | | 4/2019 |
| EP | 3815488 | * | 5/2021 |

OTHER PUBLICATIONS

U.S. Appl. No. 63/383,587 Application and Drawings filled Nov. 14, 2022, 51 pages.
Extended European Search Report and Written Opinion issued in European Patent Application No. 23209751.9 dated Apr. 17, 2024, in 05 pages.

* cited by examiner

*Primary Examiner* — Muhammad Shafi
(74) *Attorney, Agent, or Firm* — Christopher J. Volkmann; KELLY, HOLT & CHRISTENSON PLLC

(57) ABSTRACT

A signal processor in an agricultural system aggregates sensor samples to obtain an aggregated sensor value. A localization system identifies sensor samples used to obtain the aggregated sensor value and generates a localized sensor value. The agricultural system generates an action signal based on the localized sensor value.

20 Claims, 13 Drawing Sheets

TILLAGE
CONTROL
SYSTEM 155

AGRICULTURAL MACHINE CONTROL BASED ON CORRECTED OR LOCALIZED DATA SAMPLE VALUES

CROSS-REFERENCE TO RELATED APPLICATION

The present application is based on and claims the benefit of U.S. provisional patent application Ser. No. 63/383,587, filed Nov. 14, 2022, the content of which is hereby incorporated by reference in its entirety.

FIELD OF THE DESCRIPTION

The present description generally relates to agricultural equipment. More specifically, but not by limitation, the present description relates to a processing and control system for an agricultural machine that is configured to obtain data samples and generate control signals based on the data samples.

BACKGROUND

There are a wide variety of different types of agricultural machines, such as seeding or planting machines, tillage machines, material application machines, etc. Tillage machines till or otherwise engage the soil. The material application machines apply material, such as fertilizer, herbicide, pesticide, or other material to the soil. The seeders and planters can include row crop planters, or the like. The seeding or planting machines place seeds at a desired depth within a plurality of parallel seed trenches that are formed in the soil. As one example of a planting machine, a row unit is often mounted to a planter with a plurality of other row units. The planter is often towed by a tractor over soil where seed is planted in the soil, using the row units. The row units on the planter follow the ground profile by using a combination of a down force assembly that imparts a down force to the row unit to push disk openers into the ground and gauge wheels to set the depth of penetration of the disk openers. The mechanisms that are used for moving the seed from the seed hopper to the ground often include a seed metering system and a seed delivery system.

The seed metering system receives the seeds in a bulk manner, and divides the seeds into smaller quantities (such as a single seed, or a small number of seeds—depending on the seed size and seed type) and delivers the metered seeds to the seed delivery system. In one example, the seed metering system uses a rotating mechanism (which is normally a disc or a concave or bowl-shaped mechanism) that has seed receiving apertures, that receive the seeds from a seed pool and move the seeds from the seed pool to the seed delivery system which delivers the seeds to the ground (or to a location below the surface of the ground, such as in a trench). The seeds can be biased into the seed apertures in the seed metering system using air pressure (such as a vacuum or a positive air pressure differential).

There are also different types of seed delivery systems that move the seed from the seed metering system to the ground. One seed delivery system is a gravity drop system that includes a seed tube that has an inlet position below the seed metering system. Metered seeds from the seed metering system are dropped into the seed tube and fall (via gravitational force) through the seed tube into the seed trench. Other types of seed delivery systems are assistive systems, in that they do not simply rely on gravity to move the seed from the metering mechanism into the ground. Instead, such systems actively capture the seeds from the seed meter and physically move the seeds from the meter to a lower opening, where the seeds exit into the ground or trench.

Row units can also be used to apply material to the field (e.g., fertilizer, herbicide, insecticide, or pesticide, etc.) over which they are traveling. In some scenarios, each row unit has a valve that is coupled between a source of material to be applied, and an application assembly. As the valve is actuated, the material passes through the valve, from the source to the application assembly, and is applied to the field. In other scenarios, each row unit has a commodity tank and a commodity delivery system that delivers a commodity (such as fertilizer, herbicide, insecticide, pesticide, etc.) to the soil.

Tillage machines are often towed behind a towing vehicle, such as a tractor. The tillage machines can include soil engaging elements such as disks, plows, rippers, cultivators, chisel plows, etc. The soil engaging elements can be controlled to control characteristics of soil engagement, such as depth of engagement, angle of engagement, among other things.

Material application machines can include a side-dress bar, a sprayer, or other material application systems. Some such machines can open a furrow in the soil, apply material, and close the furrow. Such machines can also apply material as seed is planted or in other ways.

All of these types of agricultural machines use sensors to sense different parameters or characteristics or conditions (sensed values). Some of the sensed values include geospatial data in that the values are correlated to a geographic location. However, it can be difficult to obtain instantaneous sensed values that are meaningful. Therefore, sensed values are often aggregated (e.g., averaged) to obtain an aggregated value corresponding to a geographic location.

The discussion above is merely provided for general background information and is not intended to be used as an aid in determining the scope of the claimed subject matter.

SUMMARY

A signal processor in an agricultural system aggregates sensor samples to obtain an aggregated sensor value. A localization system identifies sensor samples used to obtain the aggregated sensor value and generates a localized sensor value. The agricultural system generates an action signal based on the localized sensor value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4A-1 shows an example of modifying a sample window.

DETAILED DESCRIPTION

Figure 1A:
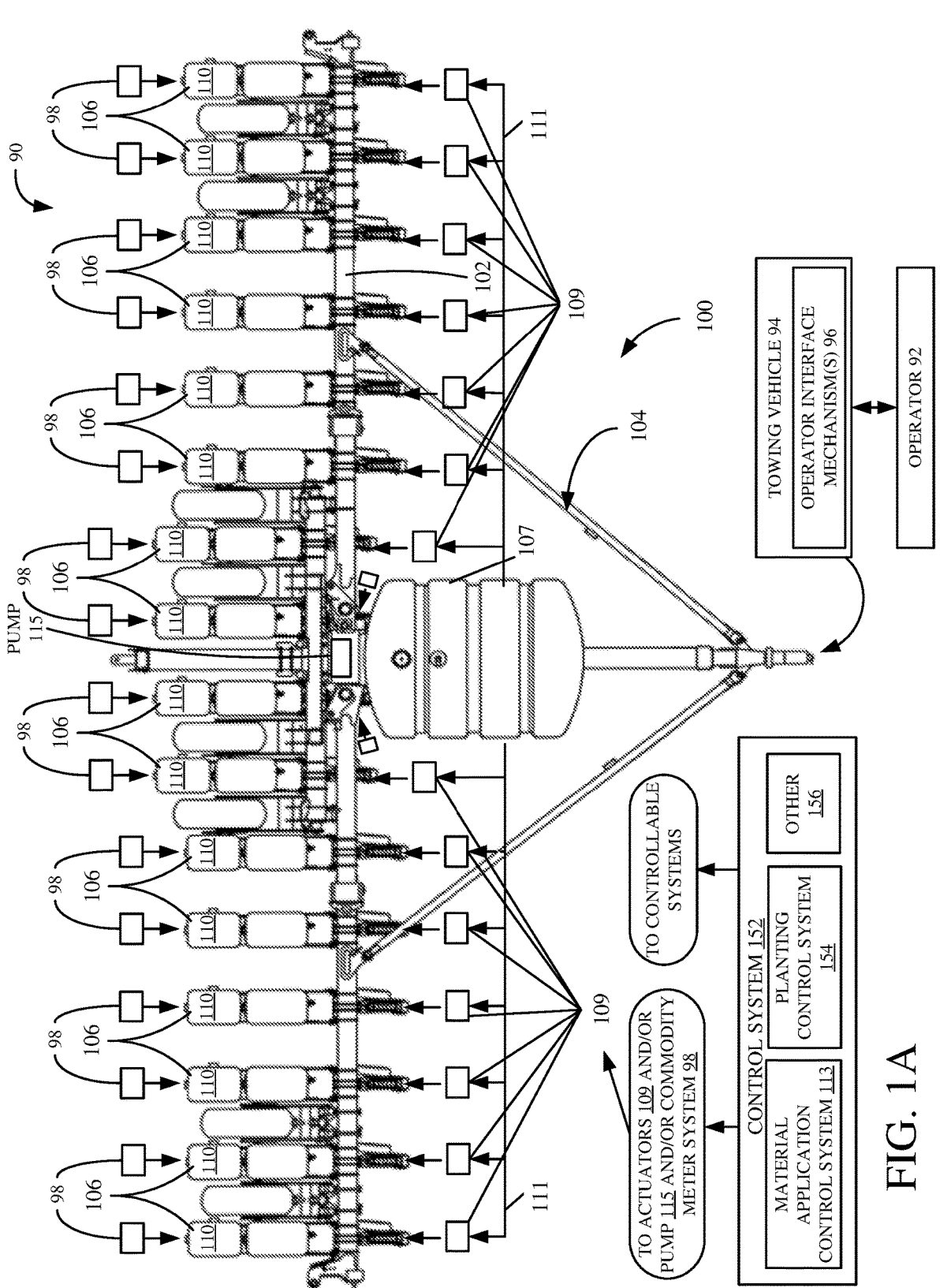
FIG. 1A shows one example of a top view of an agricultural planting machine.

As discussed above, many different types of agricultural machines have a plurality of different sensors that sense values of different variables. The sensed values can be representative of signals or values responsive to or derived from soil characteristics, planting characteristics, machine characteristics, machine operation values, material characteristics (such as crop characteristics, seed characteristics, fertilizer characteristics, other commodity characteristics, etc.), characteristics of the task or operation being performed, and a wide variety of other parameters, characteristics, and/or conditions. Also, many of the sensed values are geospatial in that they are correlated to a geographic location on the field over which the agricultural machine is traveling.

However, it is difficult to obtain an instantaneous sensed value that is meaningful, because of noise, or simply because of the nature of the value being sensed. By way of example, a sensor on a row unit may be an accelerometer or an inertial measurement unit that generates an output during operation of the planting machine that is indicative of accelerations of the row unit which are, themselves, indicative of the ride quality of the row unit (and thus indicative of whether the row unit may be bouncing out of contact with the ground, etc.). The instantaneous values generated by the sensor may vary widely, and be less meaningful than an aggregated value (such as an averaged value that is a rolling average of a plurality of different samples). Therefore, for such sensed values, a plurality of different sensor samples are aggregated, over time (or distance), and used as a value that is correlated to a particular geographic location.

This can lead to inaccuracies and errors. For instance, assume that a geospatial data point is generated for a sensed value by aggregating twenty sensor samples taken as an agricultural machine travels over a field. Assume further that the agricultural machine travels one hundred feet while the twenty samples are taken. Such an aggregated value may not represent the value that occurred over the first ten feet of the distance travelled. Instead, the aggregated value is aggregated over one hundred feet and is geospatially correlated to that particular one hundred foot distance or to a point within that one hundred foot distance. Assume that the third through fifth sensor samples contain an aberrant spike in the sensor signal that is not seen in the other seventeen sensor samples. The aberrant spike in samples three-five will affect the aggregated value generated from the twenty data samples, even though it is aberrant, and even though it can be correlated to a geographic location that is geographically localized to an area within the geographic location for which the aggregated sensor value is being generated. Thus, an aberrant spike at one point in the field can deleteriously affect the accuracy of an aggregated sensor value that corresponds to a different location or area in the field. As discussed herein, a geographic location can be a point, a linear distance (such as a portion of a route traveled by a machine), or an area.

The present description thus proceeds with respect to a system that obtains a first aggregated sensor value obtained by aggregating sensor samples taken over a first geographic location and then analyzes the sensor samples that were used to generate the first aggregated sensor value to obtain a localized sensor value (an aggregated or non-aggregated value) that more accurately represents a second geographic location that is different from (e.g., within) the first geographic location. The localized sensor value is thus more localized, and thus more accurately reflects, the sensor samples taken at the second geographic location.

Further, the system can analyze the sensor samples that were used to generate the first aggregated value to identify any aberrant samples. The geographic location of the aberrant sample can be compared to the first geographic location of the first aggregated sensor value to determine whether the aberrant sample should be removed (or its effect mitigated) from the first aggregated sensor value. A corrected aggregated sensor value is then generated.

A control system generates action signals based upon the localized sensor value and/or the corrected aggregated sensor value.

FIG. 1A is a partial pictorial, partial schematic top view of one example of an architecture 90 that includes agricultural planting machine 100, towing vehicle 94, that is operated by operator 92, and control system 152 that, itself, includes material application control system 113, planting control system 154, and other items 156. Control system 152, can be on one or more individual parts of machine 100 (such as on each row unit, or set of row units), centrally located on machine 100, distributed about the architecture 90, or on towing vehicle 94, or located (completely or partially) in a remote location, such as on the cloud. Operator 92 can illustratively interact with operator interface mechanisms 96 to manipulate and control vehicle 94, control system 152, and some or all portions of machine 100.

Machine 100 is one example of a row crop planting machine that illustratively includes a toolbar 102 that is part of a frame 104. FIG. 1A also shows that a plurality of planting row units 106 are mounted to the toolbar 102. Machine 100 can be towed behind towing vehicle 94, such as a tractor. Seeds can be carried by containers on row units 106 or in a more centralized container and delivered to row units 106. Row units 106 open furrows in the field, plant the seeds, and close the furrows. Planting control system 154 can receive sensor signals and control the planting systems on the row units. For instance, system 154 can control downforce, seed metering, seed delivery, furrow depth, propulsion and/or steering systems on the towing vehicle 94, etc.

FIG. 1A shows that material can be stored in a tank 107 and pumped through a supply line 111 so the material (fertilizer, insecticide, herbicide, pesticide, etc.) can be dispensed in or near the rows being planted. In one example, a set of devices (e.g., actuators) 109 is provided to perform this operation. For instance, actuators 109 can be individual pumps that service individual row units 106 and that pump material from tank 107 through supply line 111 so the material can be dispensed on the field. In such an example, material application control system 113 receives sensor signals and other inputs and controls the pumps 109. In another example, actuators 109 are valves and one or more pumps 115 pump the material from tank 107 to valves 109 through supply line 111. In such an example, material application control system 113 controls valves 109 by generating valve or actuator control signals. The control signal for each valve or actuator can, in one example, be a pulse width modulated control signal. The flow rate through the corresponding valve 109 can be based on the duty cycle of the control signal (which controls the amount of time the valve is open and closed). The flow rate can be based on multiple duty cycles of multiple valves or based on other criteria. Further, the material can be applied in varying rates. For example, fertilizer may be applied at one rate when it is being applied at a location where it will be spaced from a seed location and at a second, higher, rate when it is being applied at a location closer to the seed location. These are examples only.

In addition, each row unit 106 can have a commodity tank 110 that stores material to be applied. A commodity delivery system 98 can have a motor that drives a commodity meter that dispenses an amount of the material. The motor can be controlled by material application control system 113 to dispense the material at desired locations or in another desired way.

Figure 2A:
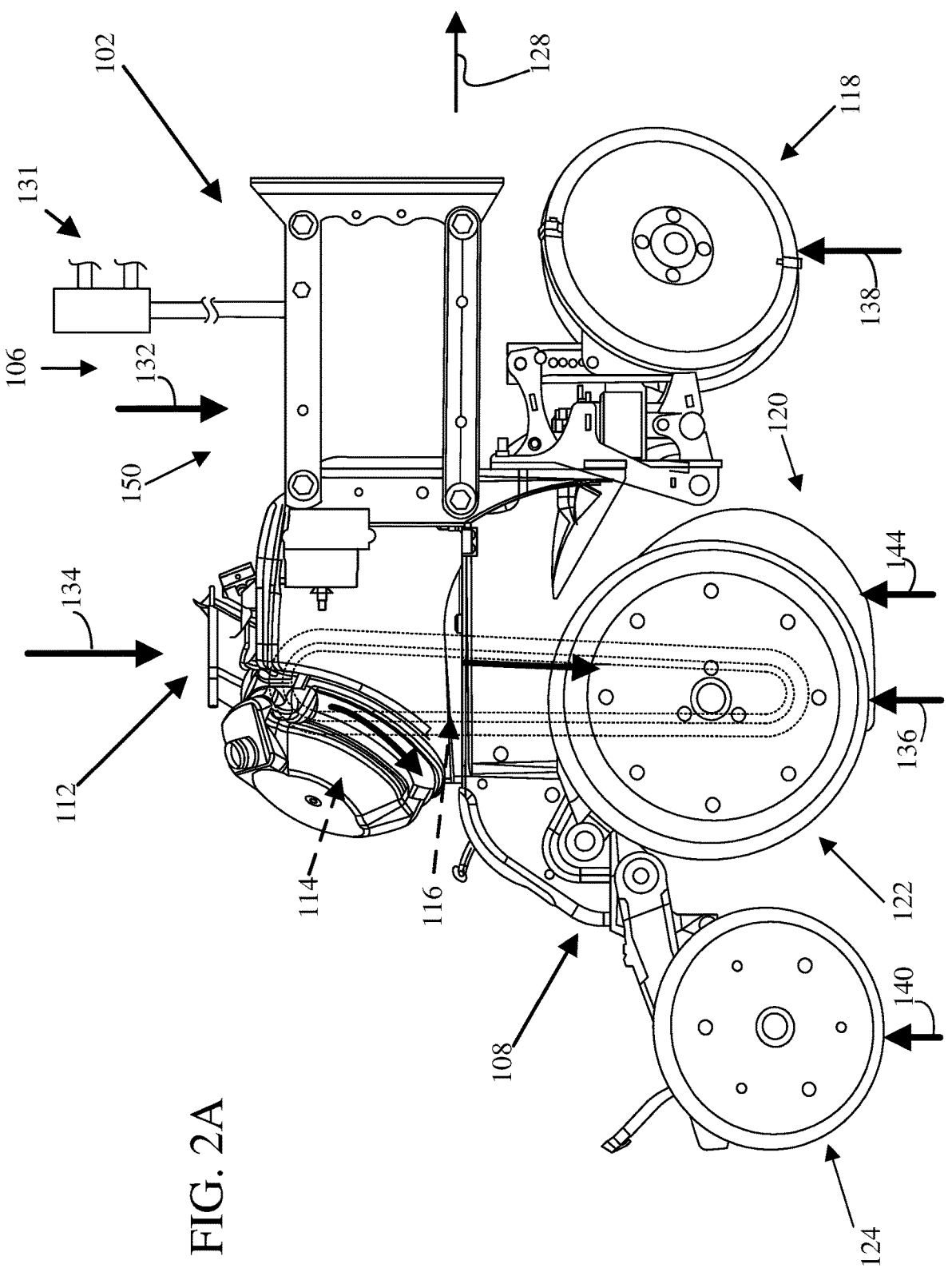
FIG. 2A shows one example of a side view of a row unit of the agricultural machine shown in FIG. 1A.

FIG. 2A is a side view showing one example of a row unit 106 (or a portion of row unit 106) in more detail. FIG. 2A shows that each row unit 106 illustratively has a frame 108. Frame 108 is illustratively connected to toolbar 102 by a linkage shown generally at 150. Linkage 150 is illustratively mounted to toolbar 102 so that it can move upwardly and downwardly (relative to toolbar 102).

Row unit 106 also illustratively has a seed hopper 112 that receives or stores seed. The seed is provided from hopper 112 to a seed metering system 114 that meters the seed and provides the metered seed to a seed delivery system 116 that delivers the seed from the seed metering system 114 to the furrow or trench generated by the row unit. In one example, seed metering system 114 uses a rotatable member, such as a disc or concave-shaped rotating member, and an air pressure differential to retain seed on the disc and move the seed from a seed pool of seeds (provided from hopper 112) to the seed delivery system 116. Other types of meters can be used as well. Row unit 106 can also include an additional hopper that can be used to provide additional material, such as a fertilizer or another chemical.

Row unit 106 includes furrow opener 120 and a set of gage wheels 122. In operation, row unit 106 moves generally in a direction indicated by arrow 128. Furrow opener 120 has blades or disks that open a furrow on the soil. Gage wheels 122 control a depth of the furrow, and seed is metered by seed metering system 114 and delivered to the furrow by seed delivery system 116. A downforce/upforce generator (or actuator) 131 can also be provided to controllably exert downforce/upforce to keep the row unit 106 in desired engagement with the soil. Downforce/upforce generator 131 can be a double acting actuator, such as a double acting hydraulic cylinder, a pneumatic actuator, or another actuator that transfers downforce (and/or upforce) from toolbar 102 to row unit 106.

Therefore, in one example, the downforce acting on row unit 106 includes the row unit downforce (or upforce) generated by downforce/upforce actuator 131 represented by arrow 132 in FIG. 2A. The downforce acting on row unit 106 also includes the self-weight of row unit 106 and the components of row unit 106 as represented by arrow 134 in FIG. 2A. The downforces 132 and 134 are countered by the force that the ground exerts on the blades on furrow opener 120 that are opening the furrow in the soil, as represented by arrow 144 in FIG. 2A. The downforces 132 and 134 are also countered by the force that the ground exerts on the gage wheels 122 (the gage wheel reaction force) indicated by arrow 136 in FIG. 2A.

FIG. 2A also shows that row unit 106 includes closing wheels 124. Closing wheels 124 close the furrow that is opened by furrow opener 120, over the seed. In the example shown in FIG. 2A, the downforce exerted on row unit 106 is also countered by the upwardly directed force imparted on closing wheels 124, as represented by arrow 140 in FIG. 2A.

FIG. 2A shows that row unit 106 can also include a row cleaner 118. Row cleaner 118 generally cleans the row ahead of the opener 120 to remove plant debris and other items from the previous growing season. Therefore, the downforce on row unit 106 is also countered by an upwardly directed force that the ground exerts on row cleaner 118, as indicated by arrow 138. Row units 106 can be configured differently than that shown in FIG. 2A and row unit 106 shown in FIG. 2A is just one example.

Figure 1B:
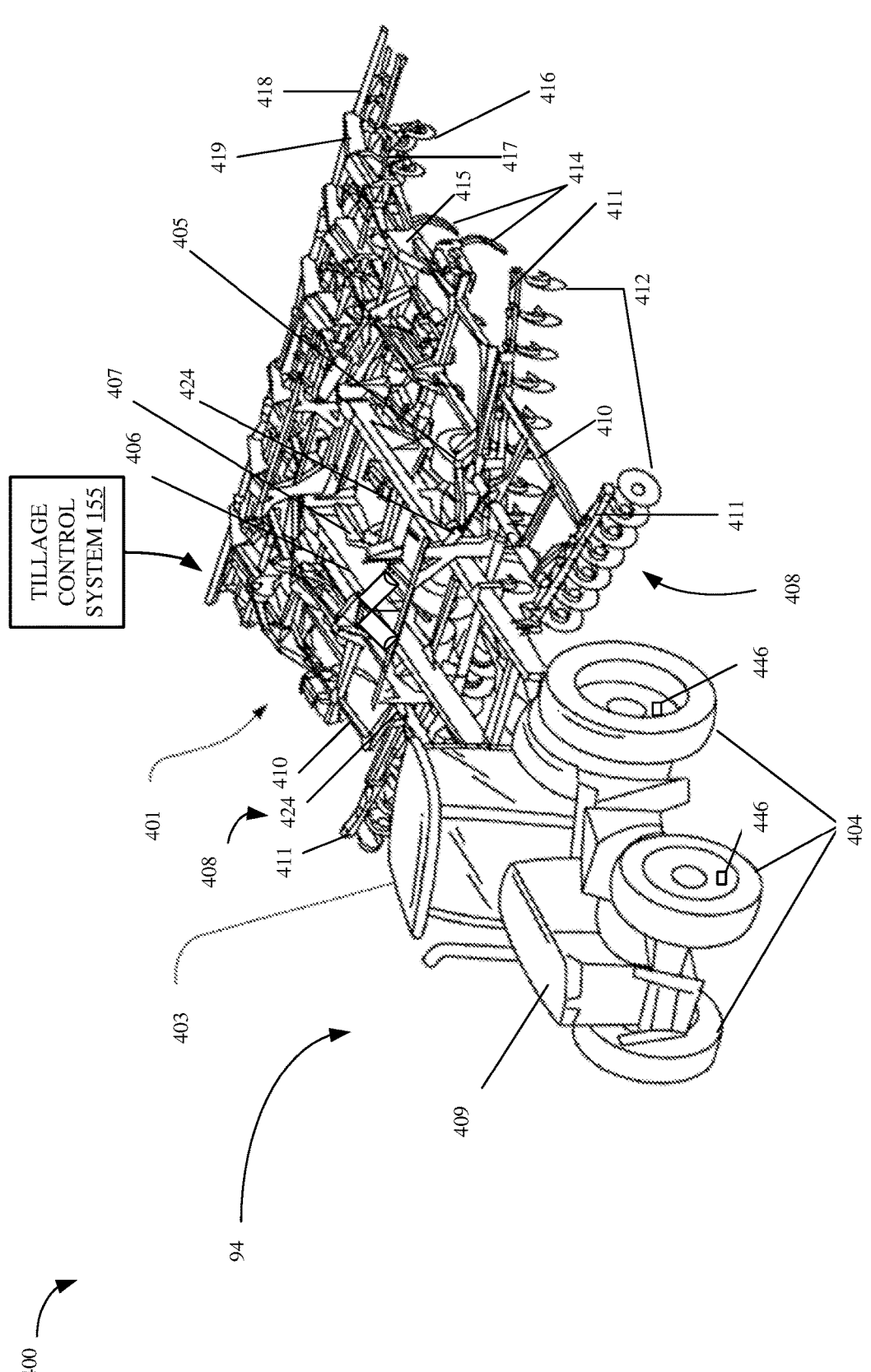
FIG. 1B is a perspective view of one example of an agricultural tillage machine.

FIG. 1B is a perspective view showing one example of a mobile agricultural tillage machine 400 that includes a towing vehicle 94, illustratively a tractor, and a tillage implement 401. Towing vehicle 94 includes an operator compartment 403, which may have various operator input mechanisms, a propulsion subsystem 409, such as a powertrain (e.g., engine or motor, transmission, etc.), and a set of ground engaging elements 404, illustratively shown as wheels, but in other examples, could be tracks. The towing vehicle 94 is coupled to and tows tillage implement 401. A tillage control system 155 receives sensor signals and generates control signals to control tillage machine 400. Tillage implement 401 includes a plurality of wheels 405 which support a frame 406 of a main section 407 above the field. Tillage implement 401 also includes a subframe 410. Tillage implement 401 further includes a plurality of wing sections 408 which are coupled to main section 407. The wing sections 408 include tool frames 411, coupled to the subframe 410, and tillage tools 412 (shown as disks) coupled to the tool frames 411. The wing sections 408 are actuatable (and deployable) by respective actuators 424 which are controllable by system 155 to change a position of wing sections 408 but are also controllable by system 155 to apply a downforce to the wing sections 408 and thus the tools 412. Implement 401 can also include a variety of other tools which are coupled to the main frame 406 or the subframe 410 via respective tool frames. For example, implement 401 includes a plurality of tillage tools 414 (shown as ripper shanks) which are coupled to respective tool frames 415, a plurality of tillage tools 416 (shown as closing disks) which are coupled to respective tool frames 417, as well as a plurality of tillage tools 418 (shown as rolling or finishing baskets) coupled to respective tool frames 419.

Figure 2B:
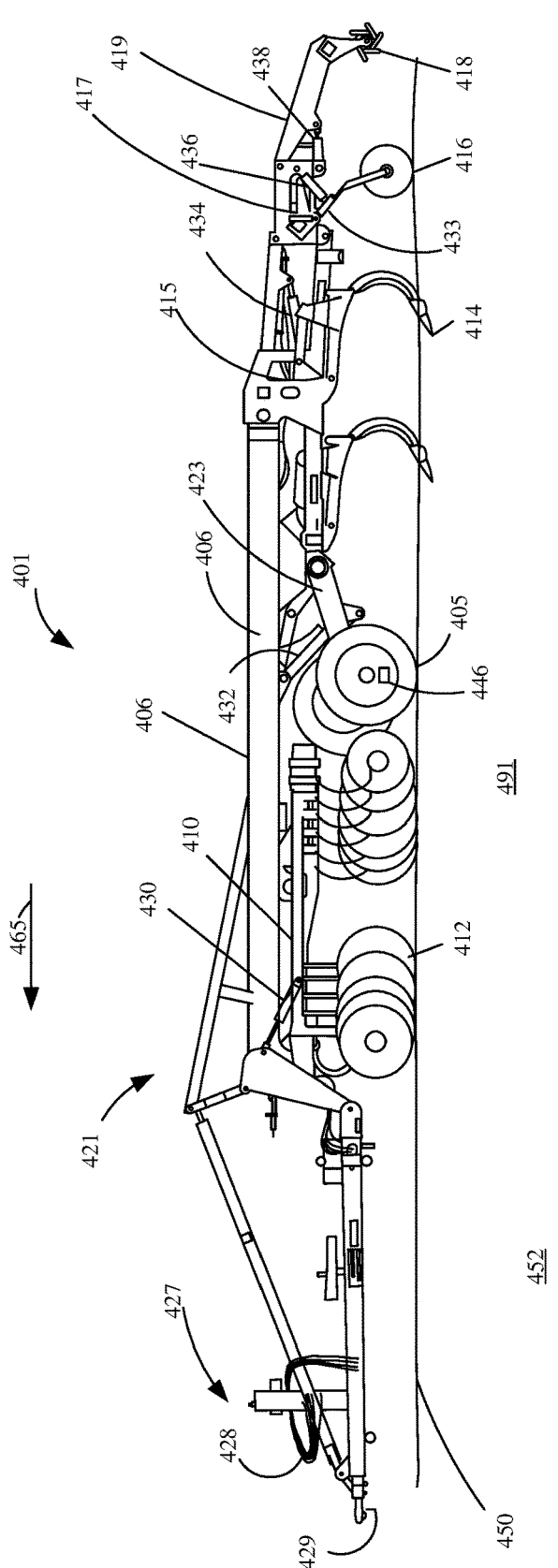
FIG. 2B is a perspective view of a tillage implement.

FIG. 2B is a perspective view showing tillage implement 401 in further detail. Tillage implement 401 is towed by towing vehicle 94 (not shown in FIG. 2B) in the direction indicated by arrow 465 and operates at a field 491. Tillage implement 401 includes a plurality of tools that can engage the surface 450 of the ground or penetrate the sub-surface 452 of the ground. As illustrated, implement 401 may include a connection assembly 427 for coupling to the towing vehicle 94. Connection assembly that includes a mechanical connection mechanism 429 (shown as a hitch) as well as a connection harness 428 which may include a plurality of different connection lines, which may provide, among other things, power, fluid (e.g., hydraulics or air, or both), as well as communication. In some examples, implement 401 may include its own power and fluid sources. The connection lines of connection harness 428 may form a conduit for delivering power and/or fluid to the various actuators on implement 401.

As illustrated in FIG. 2B, implement 401 can include a plurality of actuators. Actuators 430 are coupled between subframe 410 and hinge or pivot assembly 421 and are controllably actuatable by system 155 to change a position of the subframe 410 relative to the mainframe 406 in order to change a position of the disks 412 relative to the main-frame 406 as well as to apply a downforce to the disks 412.

Actuators 432 are coupled between a wheel frame 423 and main frame 406 and are controllably actuatable by system 155 to change a position of the wheels 405 relative to the main frame 406 and thus change a distance between main frame 406 and the surface 450 of the field 491 as well as to apply a downforce to the wheels 405. Thus, actuators 432 can be used to control the depth of the various tools of implement 401. Additionally, each wheel 405 can include a respective actuator 432 that is separately controllable by system 155 such that the implement 401 can be leveled across its width. For instance, where the ground near a left wheel 405 is lower than the ground by a right wheel, the left wheel can be extended farther, by controllably actuating a respective actuator 432, than the right wheel 405 to level the implement 401 across its width. Additionally, a tillage implement 401 may include a plurality of wheels 405 across both its width and across its fore-to-aft length such that both side-to-side leveling and fore-to-aft (e.g., front-to-back, or vice versa) leveling can be achieved by variably controlling the separate wheels. These additional wheels can be coupled to the main frame or to subframes such that wing leveling can also occur. Additionally, it will be noted that actuators 424, shown in FIG. 1B, can also act to level the wing sections 408.

Actuators 434 are coupled between tool frame 415 and main frame 406 or subframe 410 and are controllably actuatable to change a position of tools 414 as well as to apply a downforce to tools 414. While tools 414 are shown as ripper shanks, in other examples a tillage implement 401 may include other tools, alternatively or in addition to ripper shanks, such as tines.

Actuators 436 are coupled between tool frame 417 and tool subframe 433 and are controllably actuatable to change a position of tools 416 as well as to apply a downforce to tools 416. While tools 414 are shown as ripper shanks, in other examples a tillage implement 401 may include other tools, alternatively or in addition to ripper shanks, such as tines.

Actuators 438 are coupled between tool frame 417 and tool frame 419 and are actuatable to change a position of tools 418 as well as apply a downforce to tools 418.

Figure 1C:
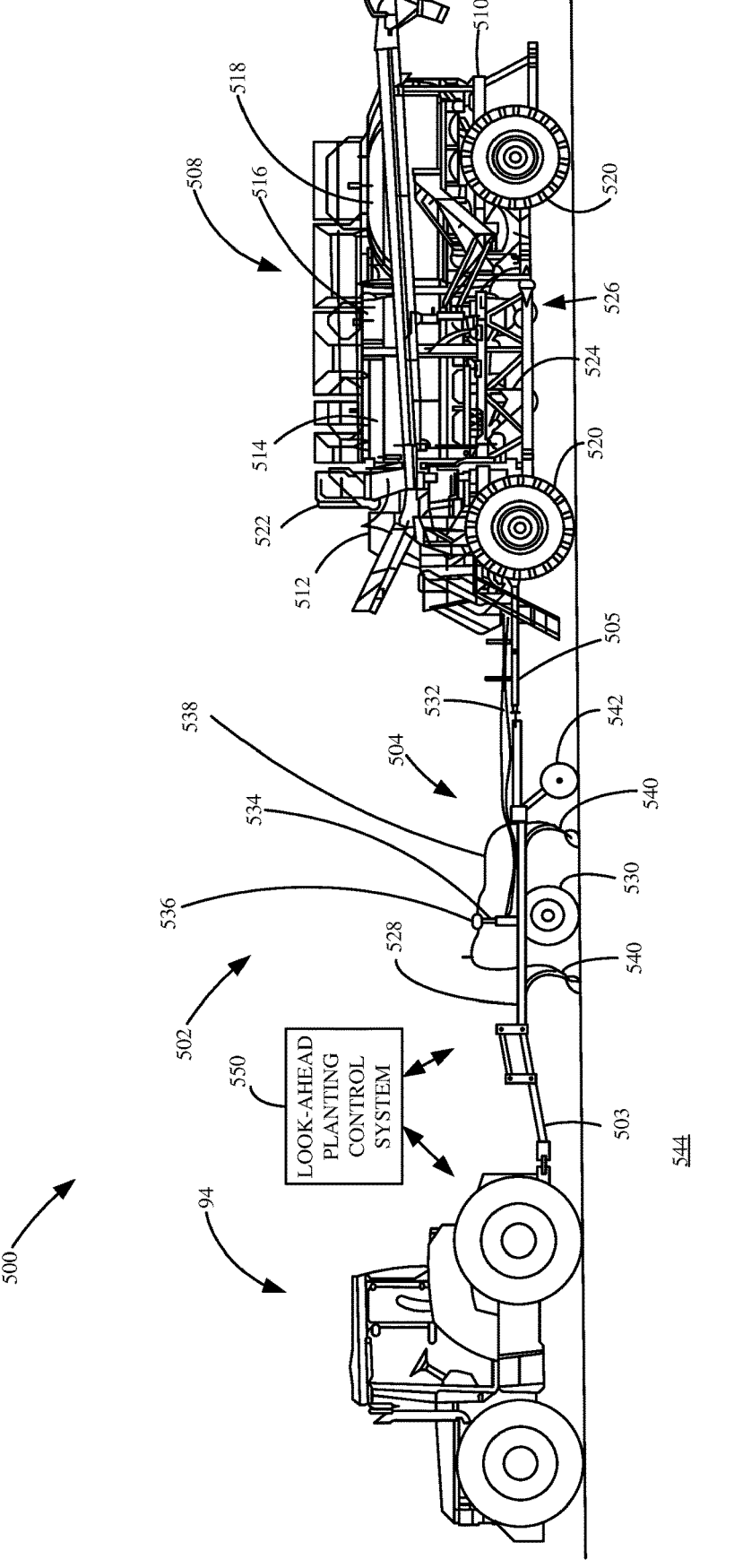
FIG. 1C is a side view of one example of a pneumatic seeding machine.

FIG. 1C is a side view of an example of an agricultural system 500 which includes an agricultural implement, in particular an air or pneumatic seeder 502. In the example shown in FIG. 1C, the seeder 502 comprises a tilling implement (or seeding tool) 504 (also sometimes called a drill) towed between a tractor (or other towing vehicle) 94 and a commodity cart (also sometimes called an air cart) 508. The commodity cart 508 has a frame 510 upon which a series of product tanks 512, 514, 516, and 518, and wheels 520 are mounted. Each product tank has a door (a representative door 522 is labeled) releasably sealing an opening at its upper end for filling the tank with product, most usually a commodity of one type or another. A metering system 524 is provided at a lower end of each tank (a representative one of which is labeled) for controlled feeding or draining of product (most typically granular material) into a pneumatic distribution system 526. The tanks 512, 514, 516, and 518 can hold, for example, a material or commodity such as seed or fertilizer to be distributed to the soil. The tanks can be hoppers, bins, boxes, containers, etc. The term "tank" shall be broadly construed herein. Furthermore, one tank with multiple compartments can also be provided instead of separated tanks.

The tilling implement or seeding tool 504 includes a frame 528 supported by ground wheels 530. Frame 528 is connected to a leading portion of the commodity cart 508, for example by a tongue style attachment (not labeled). The commodity cart 508 as shown is sometimes called a "tow behind cart," meaning that the cart 508 follows the tilling implement 504. In an alternative arrangement, the cart 508 can be configured as a "tow between cart," meaning the cart 508 is between the tractor 94 and tilling implement 504. In yet a further possible arrangement, the commodity cart 508 and tilling implement 504 can be combined to form a unified rather than separated configuration. These are just examples of additional possible configurations. Other configurations are also possible and all configurations should be considered contemplated and within the scope of the present description.

In the example shown in FIG. 1C, tractor 94 is coupled by couplings 503 to seeding tool 504 which is coupled by couplings 505 to commodity cart 508. The couplings 503 and 505 can be mechanical, hydraulic, pneumatic, and electrical couplings and/or other couplings. The couplings 503 and 505 can include wired and/or wireless couplings as well.

The pneumatic distribution system 526 includes a fan (not shown) connected to a product delivery conduit structure having multiple product flow passages 532. The fan directs air through the flow passages 532. Each product metering system 524 controls delivery of product from its associated tank at a controllable rate to the transporting airstreams moving through flow passages 532. In this manner, each flow passage 532 carries product from the tanks to a sec-ondary distribution tower 534 on the tilling implement 504. Typically, there will be one tower 534 for each flow passage 532. Each tower 534 includes a secondary distributing manifold 536, typically located at the top of a vertical tube. The distributing manifold 536 divides the flow of product into a number of secondary distribution lines 538. Each secondary distribution line 138 delivers product to one of a plurality of ground engaging tools 540 (also known as ground openers) that define the locations of work points on seeding tool 504. The ground engaging tools 540 open a furrow in the soil 544 and facilitate deposit of the product therein. The number of flow passages 532 that feed into secondary distribution may vary from one to eight or ten or more, depending at least upon the configuration of the commodity cart 508 and tilling implement 504. Depending upon the cart and implement, there may be two or more distribution manifolds 536 in the air stream between the meters 524 and the ground engaging tools 540. Alterna-tively, in some configurations, the product is metered directly from the tank or tanks into secondary distribution lines that lead to the ground engaging tools 540 without any need for an intermediate distribution manifold. The product metering system 524 can be configured to vary the rate of delivery of seed to each work point on tool 504 or to different sets or zones of work points on tool 504. The configurations described herein are only examples. Other configurations are possible and should be considered con-templated and within the scope of the present description.

A firming or closing wheel 542 associated with each ground engaging tool 540 trails the tool and firms the soil over the product deposited in the soil. In practice, a variety of different types of tools 540 are used including, but not necessarily limited to, tines, shanks and disks. The tools 540 are typically controllably moveable between a lowered position engaging the ground and a raised position riding above the ground. Each individual tool 540 may be configured to be raised by a separate actuator. Alternatively, multiple tools 540 may be mounted to a common component for movement together. In yet another alternative, the tools 540 may be fixed to the frame 528, the frame being configured to be raised and lowered with the tools 540.

Examples of air or pneumatic seeder 502 described above should not be considered limiting. The features described in the present description can be applied to any seeder configuration, or other material application machine, whether specifically described herein or not.

FIG. 1C also shows that agricultural system 500 can include various other systems, such as, for example, look-ahead planting control system 550. System 550 senses the yaw rate on tractor 94 and uses that yaw rate to predict the yaw rate across the frame 528 of implement 504, at the different work points where seeds are delivered to the furrows.

It will be appreciated, that different portions of system 550 can reside on tractor 94, on tool or implement 504, and/or on air cart 508, or all of the elements of system 550 can be located at one place (e.g., on tractor 94). Elements of system 550 can be distributed to a remote server architecture or in other ways as well. The sensed yaw rate can be used to control various actuators on the air or pneumatic seeder 502.

Figure 2C:
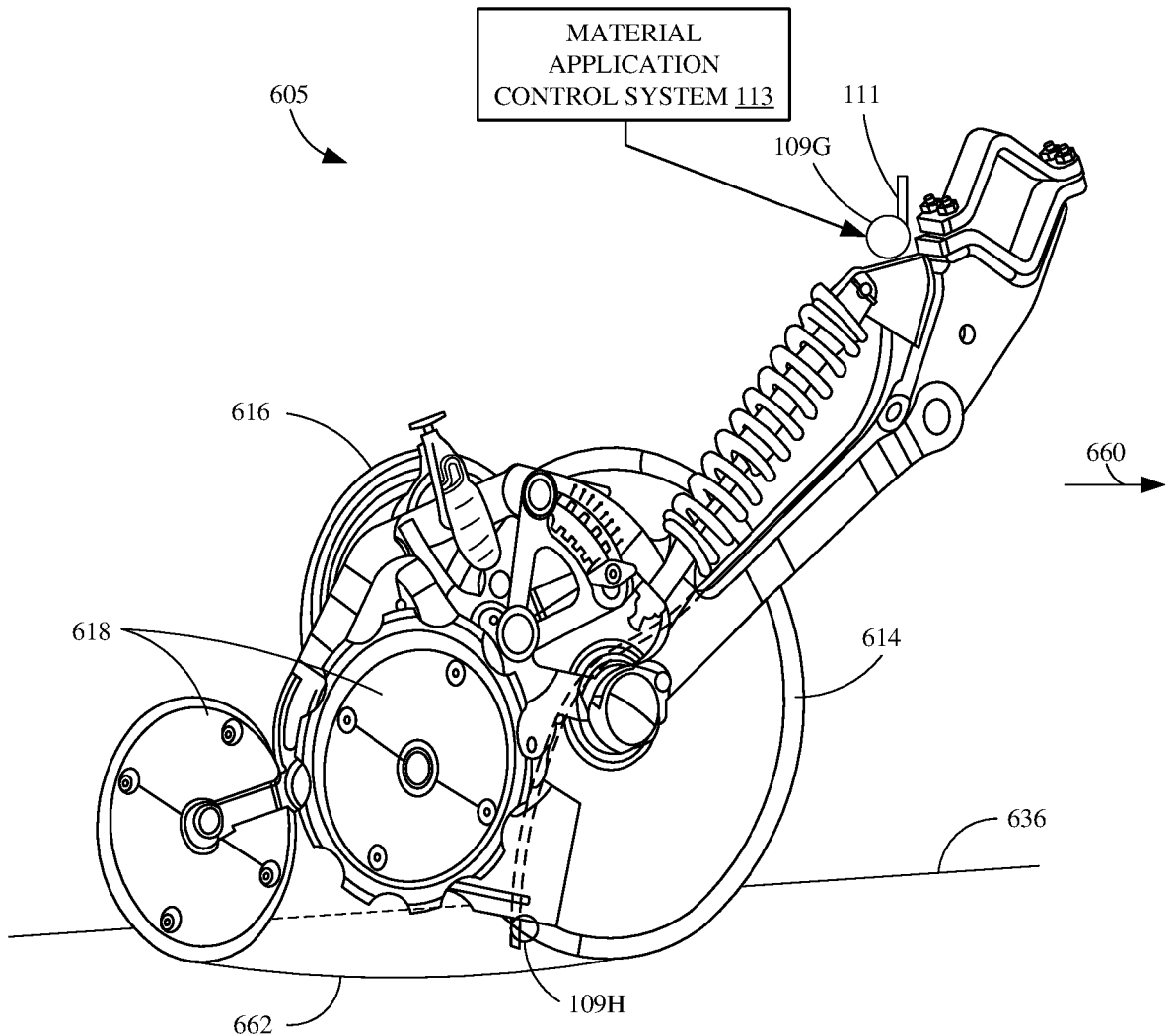
FIG. 2C is a side view of one example of a side dress bar.

FIG. 2C is a side perspective view of an applicator unit 605. Applicator unit 605 can be attached to a tillage machine, a planting machine, or another machine. Briefly, in operation, applicator unit 605 attaches to a side-dress bar that is towed behind a towing vehicle 94, so unit 605 travels between rows (if the rows are already planted). However, instead of planting seeds, applicator unit 605 applies material at a location between rows of seeds (or, if the seeds are not yet planted, between locations where the rows will be, after planting). When traveling in the direction indicated by arrow 660, disc opener 614 (in this example, it is a single disc opener) opens furrow 662 in the ground 636, at a depth set by gauge wheel 616. When actuator 109 is actuated, material is applied in the furrow 662 and closing wheels 618 then close the furrow 662.

As unit 605 moves, material application control system 113 controls actuator 109 to dispense material. The dispensing of material can be done relative to seed or plant locations, if they are sensed or are already known or have been estimated. The dispensing of material can also be done before the seed or plant locations are known. In this latter scenario, the locations where the material is applied can be stored so that seeds can be planted later, relative to the locations of the material that has been already dispensed.

FIG. 2C shows that actuator 109 can be mounted to one of a plurality of different positions on unit 605. Two of the positions are shown at 109G and 109H. These are examples and the actuator 109 can be located elsewhere as well. Similarly, multiple actuators can be disposed on unit 605 to dispense multiple different materials or to dispense the material in a more rapid or more voluminous way than is done with only one actuator 109.

It should also be noted that portions of the present discussion proceed with respect to a planting machine and sensors on the planting machine that generate sensor signals that are used to generate geospatial data. However, it will be appreciated that the present system can be used with any of a wide variety of different types of agricultural machines, such as tillage machines, material application machines, those described above, and others, that have sensors that are used to generate geospatial data.

Figure 3:
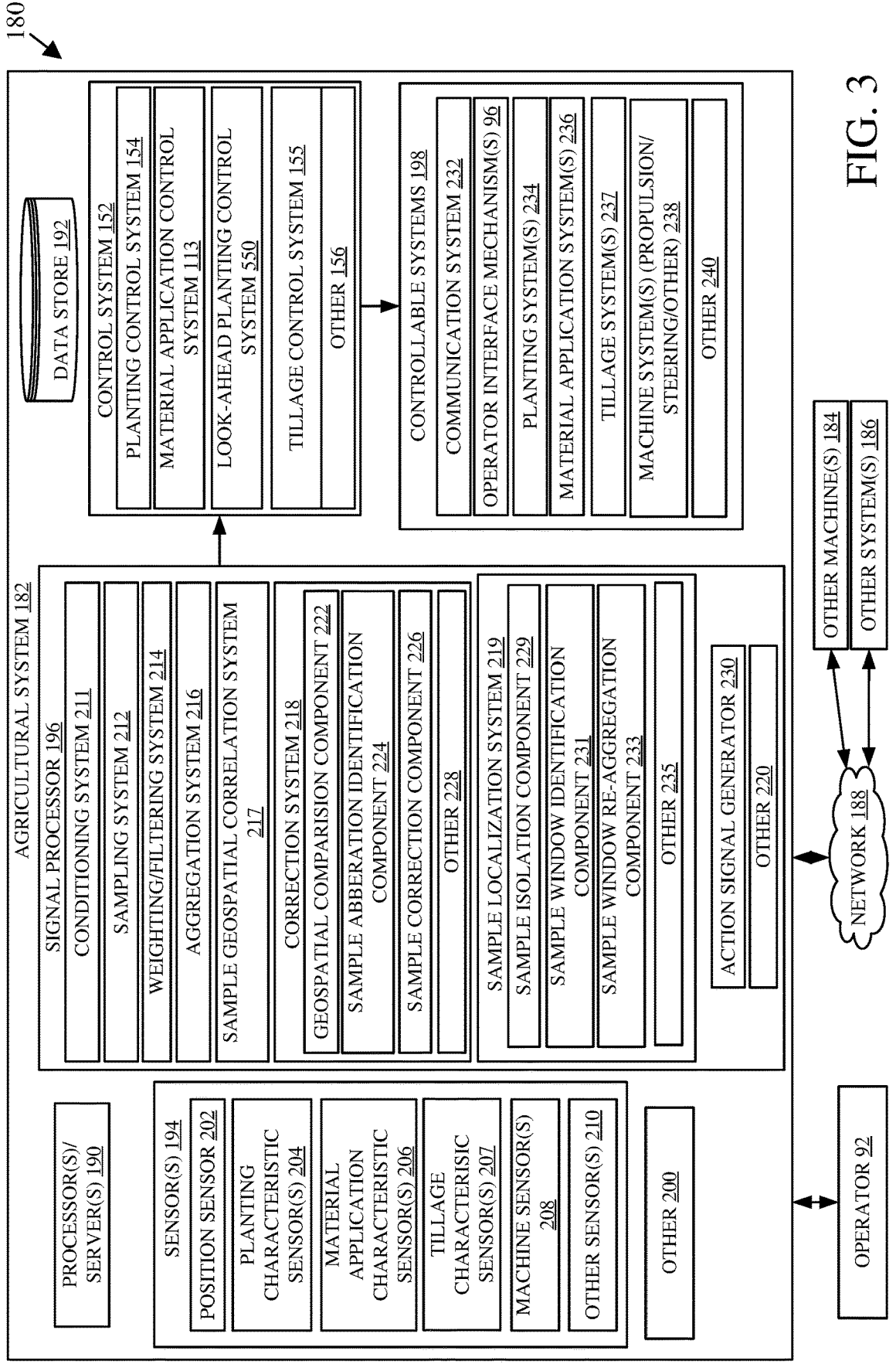
FIG. 3 is a block diagram showing an example of an agricultural system.

FIG. 3 is a block diagram of one example of an architecture 180 in which an agricultural system 182 can communicate with one or more other machines 184 and other systems 186 over network 188. Some items are similar to those shown in previous FIGS. and they are similarly numbered. Network 188 can be a wide area network, a local area network, a near field communication network, a cellular communication network, a WIFI network, a Bluetooth network, or any of a wide variety of other networks or combinations of networks. In FIG. 3, operator 92 can also interact with certain portions of agricultural system 182. Also, in the example shown in FIG. 3, the items in agricultural system 182 can be on a row unit 106, agricultural machine 100, a towing vehicle 94, any of machines 402, 502, 605, a remote system (such as in the cloud), or elsewhere. The items in agricultural system 182 can be dispersed at different locations and on different machines and systems, or all of the items in agricultural system 182 can be located at a single location.

In the example shown in FIG. 3, agricultural system 182 includes one or more processors or servers 190, data store 192, one or more sensors 194, signal processor 196, control system 152, controllable systems 198, and other items 200. Sensors 194 can include position sensor 202, planting characteristic sensors 204, material application characteristic sensors 206, tillage characteristic sensors 207, machine sensors 208, and other sensors 210. Signal processor 196 includes conditioning system 211, sampling system 212, weighting/filtering system 214, aggregation system 216, sample geospatial correlation system 217, correction system 218, sample localization system 219, action signal generator 230, and other items 220. Correction system 218 includes geospatial correlation component 222, sample aberration identification component 224, sample correction component 226, and other items 228. Sample localization system 219 includes sample isolation component 229, sample window identification component 231, sample window re-aggregation component 233, and other items 235. Control system 152 can include planting control system 154, material application control system 113, tillage control system 155, and other systems 156. Controllable systems 198 can include communication system 232, operator interface mechanisms 96, planting system 234, material application system 236, tillage systems 237, machine systems (propulsion/steering/other) 238, and any of a wide variety of other systems 240. Before describing the overall operation of agricultural system 182 in more detail, a description of some of the items in system 182, and their operation, will first be provided.

Position sensor 202 can be a global navigation satellite system (GNSS) receiver, a cellular triangulation system, or any of a wide variety of other sensors or sensing systems that provide an output indicative of the location of sensor 202 in a global or local coordinate system. Planting characteristic sensors 204 can be any of a wide variety of different types of sensors that sense characteristics and/or parameters and/or conditions of the planting operation being performed and generate a signal responsive to the variable being sensed. Some such sensors can include downforce sensors that sense the downforce on row units 106, furrow sensors that sense the depth and/or quality of the furrow opened by the row units 106, residue sensors that sense residue, soil characteristic sensors that sense soil characteristics (such as soil type, soil moisture, etc.), seed sensors that sense such things as the seed position and the seed orientation within the furrow, seed-to-soil contact sensors that sense the seed-to-soil contact within the furrow, the number of seed skips or multiples, or a wide variety of other planting characteristics, parameters or conditions. Material application characteristic sensors 206 can sense characteristics and/or parameters and/or conditions of material being applied (such as seeds, herbicide, pesticide, fertilizer, etc.) and generate a signal responsive to the variable being sensed. Thus, material application characteristic sensors 206 can sense the viscosity or density of the material being applied, the temperature of the material being applied, the velocity of material as it exits an application nozzle, the pressure drop across a nozzle that is applying material, the performance of the application (such as whether material is being applied at a desired location), and/or any of a wide variety of other material application characteristics. Tillage characteristic sensors 207 can sense characteristics and/or parameters and/or conditions of the tillage operation being performed by a tillage system and generate signals responsive to the sensed variables. For instance, sensors 207 can sense whether the tillage implement is level, the depth of soil engagement, the distribution of soil by the tillage systems, residue, soil type/moisture, forces external on the tillage system, etc. Machine sensors 208 can sense characteristics, or parameters, and/or conditions of the planting machine and/or the planting operation and generate a signal responsive to the sensed variable. For instance, machine sensors 208 can sense machine settings, fuel consumption or fuel efficiency, power usage, ride quality (which may be indicative of whether the row unit maintains consistent ground contact), machine speed, machine direction, the speed and/or position of the seed metering system, and/or the seed delivery system, and/or other systems, machine orientation (such as whether the machine is operating on a side hill, etc.), or any of a wide variety of other characteristics. The sensors 194 generate sensor signals responsive to the sensed variables which are provided to signal processor 196.

Some examples of values that can be sensed or generated in response to sensed values can include the following:

When the agricultural machine is a planting machine, then the following values can be obtained based on or responsive to values sensed relative to the singulation system:

Actual seeding rate,

Seed spacing uniformity,

Singulating performance (missing, extra),

Energy consumption characteristics,

Wear/performance degradation detection,

Seed characteristic measurements,

Productivity statistics,

Estimation (e.g., of time or distance) to product refill, and

Predictive product refill locations (next pass, geolocation of refill point).

The following values can be obtained based on or responsive to values sensed relative to a liquid metering system:

Actual product application rate,

Product metering uniformity,

Product placement performance (e.g., missing, or extra product),

Energy consumption characteristics,

Wear/performance degradation detection,

Product characteristics (density, adhesion, etc.),

Productivity statistics,

Estimation (e.g., of time or distance) to product refill, and

Predictive product refill locations (next pass, geolocation of refill point)

The following values can be obtained based on or responsive to values sensed relative to a ground engaging element:

Soil compaction,

Soil penetration force,

Trench compaction,

Depth uniformity characteristics,

Trench forming quality,

Ground following performance,

Residue indicators,

Soil chemical properties,

Surface residue characteristics,

Trench closing characteristics,

Energy consumption characteristics, and

Wear/performance degradation detection.

When the agricultural machine is an air seeding machine, then the following values can be obtained based on or responsive to values sensed relative to a dry volumetric metering system:

Actual metering rate,

Product characteristics (density, adhesion, etc.),

Productivity statistics,

Estimation to product refill (time/distance),

Predictive product refill locations (next pass, geolocation of refill point), Energy consumption characteristics, and Wear/performance degradation detection.

The following values can be obtained based on or responsive to values sensed relative to a seed distribution system and/or a ground engaging element:

Product flow characteristics,

Metering to row distribution characteristics,

Mechanical system parameters (example: time delay for product flow),

Machine ground engagement indicators, soil penetration force characteristics,

Engagement performance characteristics,

Physical soil characteristics (soil types, rocks, etc.),

Soil chemical characteristics,

Energy consumption characteristics, and

Wear/performance degradation detection.

When the agricultural machine is a tillage machine, then the following values can be obtained based on or responsive to values sensed relative to ground engaging elements:

Machine ground engagement indicators, soil penetration force characteristics,

Engagement performance characteristics,

Physical soil characteristics (soil types, rocks, etc.),

Soil chemical characteristics,

Energy consumption characteristics,

Wear/performance degradation detection,

Ground following performance,

Residue indicators, and soil residue profile and characteristics.

These are examples only.

Signal processor 196 processes the signals and generates an output which can be used by control system 152 in controlling the various controllable systems 198. Signal conditioning system 211 can perform various types of signal conditioning on the sensor signals. Such conditioning can include amplifying, linearizing, normalizing, etc. Sampling system 212 samples the sensor signals in a desired way defined by sampling parameters. For instance, it may be that sampling system 212 samples the signals at a sampling rate so that a desired number of samples are obtained over a given time period. In another example, it may be that sampling system 212 samples the sensor signals a desired number of times per unit of distance traveled by the machine. By way of example, it may be that the sensor signal is to be sampled every six inches of machine travel. Sampling system 212 may sample the sensor signals in another time-based or distance-based way as well. Also, sampling may be based on the sensed value. For example, if the sensed value is changing quickly relative to the sampling rate, the sampling rate may be increased. If the sensed value is changing slowly relative to the sampling rate, than the sampling rate may be reduced.

Sampling system 212 obtains a value of the sensor signal being sampled, and saves that sensor signal value as a sample. The signal samples can also be weighted by weighting system 214, as desired. For instance, it may be that signal samples taken more recently are weighted higher than those taken less recently. Further, it may be that signals taken under certain conditions (such as when the machine is operating faster or slower) may be weighted differently than those taken under other conditions. The signal samples and the weighted samples can be stored in data store 192 or elsewhere where they can be accessed by aggregation system 216. Aggregation system 216 obtains multiple different signal samples taken at different times and/or at different locations, and aggregates the signal samples to obtain an aggregated sensor value. For instance, it may be that aggregation system 216 generates an average sensor value for the eight most recent weighted signal samples to obtain an aggregated sensor value. Sample geospatial correlation system 217 then correlates the aggregated sensor value to a geographic location to obtain a geospatial value that identifies the aggregated sensor value correlated to a geographic location. For instance, each of the signal samples may include a geographic stamp or a timestamp or other indicator indicating where/when the samples were taken. In another example, the sample geospatial correlation system 217 can obtain a position indicator from position sensor 202 when the aggregated sensor value is generated. System 217 can assign a geographic location to the aggregated sensor value, or can map the aggregated sensor value to a geographic map, or can generate a correlation between the aggregated sensor value and a geographic location in other ways, thus generating a geospatial sample.

As discussed above, it may be that some of the sample values used to generate the aggregated sensor value may be aberrant. The values of such an aberrant sample may be aberrations for any of a wide variety of different reasons. For instance, the sensors may be sensing in a noisy environment which can cause the sensor signals to spike, or to drop out, or to otherwise indicate an erroneous value. Therefore, correction system 218 analyzes the samples used to generate the aggregated sensor value to identify whether any of them are aberrant and if so, corrects the aggregated sensor value for the aberration. Sample aberration identification component 224 identifies sample values that were considered in generating the aggregated sensor value, that are deemed to be aberrant. In one example, an aberration can be identified if the value of the sample under analysis deviates from the values of samples on either side of it by a threshold amount. In another example, an aberrant sample can be identified if the value of the sample under analysis deviates from the aggregated sample value by a threshold amount. The sensor values can be identified as aberrant values in any of a wide variety of other ways as well.

Figures 4A, 4B:
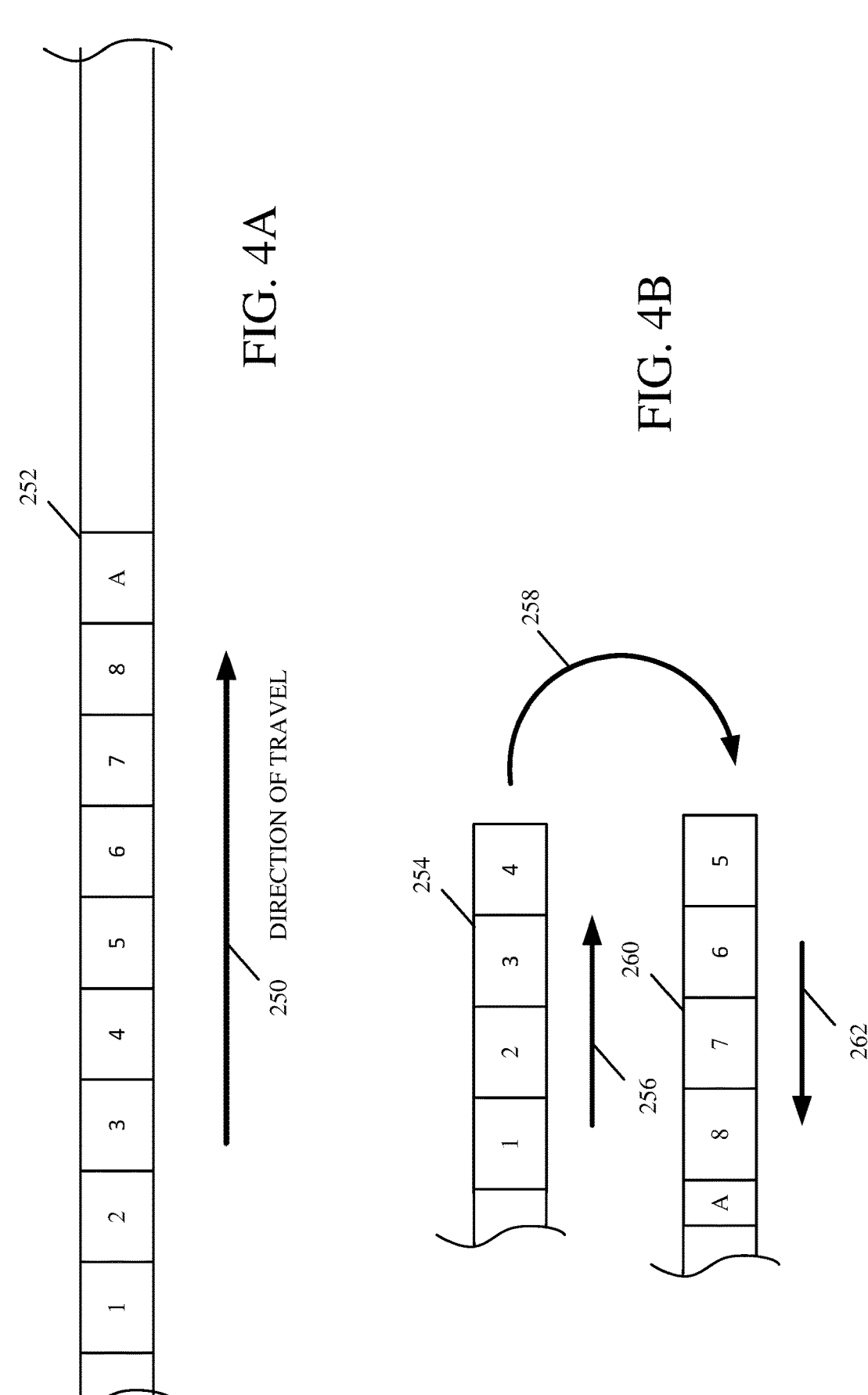
FIGS. 4A and 4B show two different examples of geospatially correlated sensor samples.

Once sample aberration identification component 224 identifies particular samples that are aberrations, then geospatial comparison component 222 can determine how close the geographic location of the aberrant sample is to the geographic location assigned to the aggregated sensor value. By way of example, FIG. 4A shows an example in which an agricultural machine is traveling in the direction of travel indicated by arrow 250 along a route 252. As the agricultural machine is traveling along the route 252, a sensor (such as a planting characteristic sensor 204), is generating a sensor signal indicative of a planting characteristic and sampling system 212 is generating signal samples corresponding to different geographic locations along route 252. Assume also that the aggregation system 216 aggregates eight signal samples (such as by averaging them) to generate the aggregated sensor value. In that case, aggregation system 216 aggregates the sensor samples 1-8 (shown in FIG. 4A) and averages them to obtain an aggregated value A. Geospatial correlation system 217 assigns the geographic location corresponding to sensor value A on route 252 to the aggregated sensor value. If sample 1 is identified by sample aberration identification component 224 as an aberrant sample, it can be seen in FIG. 4A that the geographic location from which sample 1 was taken is significantly separated from the geographic location of aggregated sensor value A. Thus, the aberrant sample 1 may be more readily disregarded from the aggregated sensor value A because it is geospatially removed from the geographic location of the aggregated sensor value A by a significant distance.

FIG. 4B, on the other hand, shows an example in which the agricultural machine is first traveling along a route 254 in the direction indicated by arrow 256 and then makes a headland turn as indicated by arrow 258, and begins traveling along route 260 in the direction indicated by arrow 262, thus making an adjacent pass in the same field. In the example shown in FIG. 4B, it can be seen that the first four samples were taken at the end of route 254, while the last four samples were taken at the beginning of route 260. Thus, samples 1 and 8 are taken adjacent one another in the field. Geospatial comparison component 222 thus compares the locations of value A (which is also the geographic location corresponding to the aggregated sensor value) and the geographic location of sample 1 (the aberrant sample). Since the two geographic locations are relatively close to one another, then the aberrant sample 1 may be handled in a different way than in the example shown in FIG. 4A. For instance, in the example shown in FIG. 4A, the aberrant sample 1 may simply be discarded from the aggregated sample or replaced with another value because it is so far removed from the geographic location of the aggregated sensor value. However, in the example shown in FIG. 4B, the aberrant sample 1 may continue to be included in the aggregated sensor value A, because it is closely adjacent the geographic location for the aggregated sensor value.

After sample aberration identification component 224 has identified an aberrant sample, and after geospatial comparison component 222 has compared the geographic locations corresponding to the aggregated sensor value and the aberrant sample, sample correction component 226 can implement a correction to the aggregated sample. Again, if the aberrant sample is closely proximate the geographic location of the aggregated sensor value (e.g., immediately adjacent the aggregated senor value), the sample correction component 226 may make no correction, or may make a modest correction (such as by reducing the weight of the aberrant sample but still including it in the aggregated sensor value). However, if the aberrant sample is geographically removed from the geographic location of the aggregated sensor value by a significant distance (such as a threshold distance), then sample correction component 226 may correct the aggregated sensor value in a different way, such as by significantly de-weighting the aberrant sensor value, removing the aberrant sample from consideration in the aggregated sample, or in other ways.

Also, as discussed above, it may be that an aggregated sensor value is aggregated over a relatively large number of samples, but the operator or another system may be interested in a more localized value, such as a value which corresponds to only a subset of the sensor samples considered in generating the aggregated sensor value. Further, it may be that the aggregated sensor value is aggregated from samples taken over a first, relatively large geographic location, but the operator or another system may be interested in obtaining a more localized value which is taken from samples generated over a smaller location, such as a location that is within the first geographic distance. It will be noted that localization can be performed in terms of time as well so that the localized value is generated using samples generated during a time window that is smaller than the time window over which the samples were generated to obtain the aggregated sensor value. The present discussion proceeds with respect to localizing in terms of geographic location, but this is only one example. Sample localization system 219 identifies the desired sample window for which a localized, aggregated sample is to be generated and identifies the particular sample values that are to be considered in generating the localized, aggregated sensor value.

Figures 1, 4A:
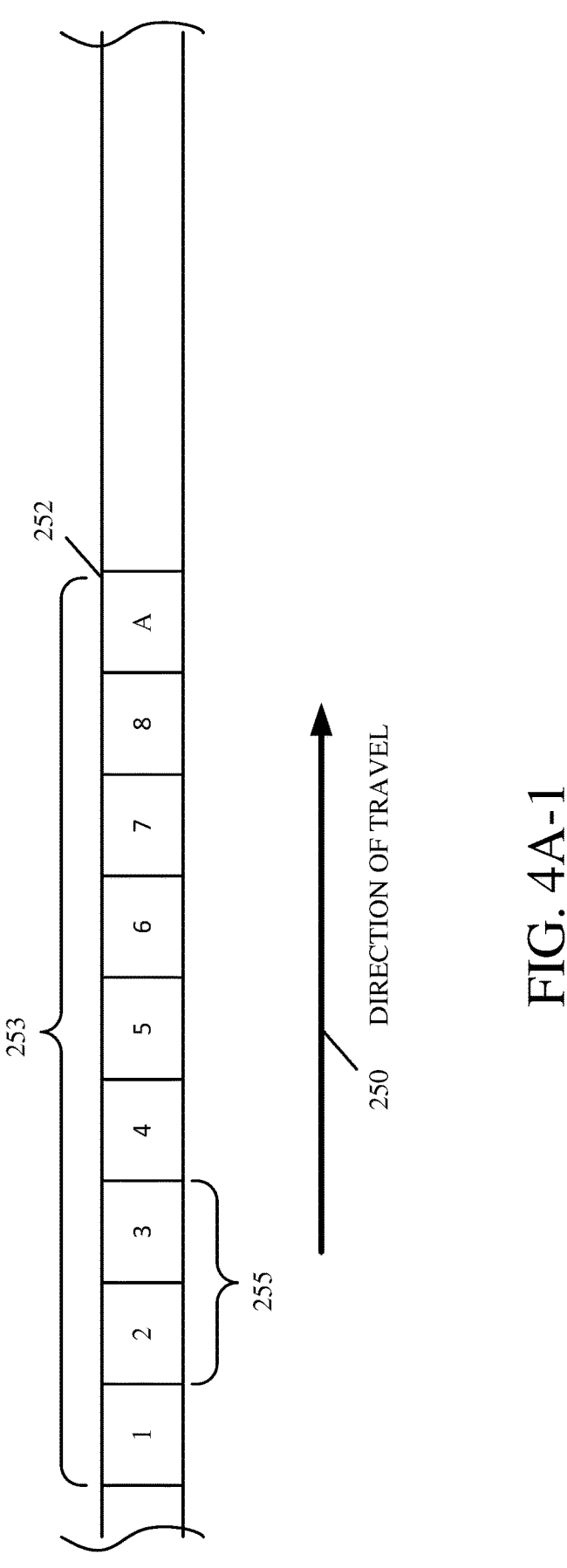

For instance, FIG. 4A-1 is similar to FIG. 4A, and similar items are similarly numbered. It can be seen in FIG. 4A-1 that the aggregated sensor value A is generated from samples taken over a first geographic region (or sample window) 253. It may be, however, that the operator or another system wishes to obtain a more localized sensor value for a geographic region (or sample window) 255 that is within the geographic region 253. In that case, sample isolation component 229 isolates the individual samples 1-8 that are used to obtain the aggregated sensor sample A. The samples 1-8 may be isolated based on the geographic locations assigned to the samples, based on a times when the samples were generated or in other ways. Sample window identification component 231 identifies the sample window 255 for the localized region of interest. For instance, the sample window 255 may be identified by geographic location, or by another indicator that serves to indicate which individual samples 1-8 are to be used in generating the localized sensor value for sample window 255. Sample window re-aggregation component 233 then aggregates the number of samples corresponding to sample window 255 to generate a new aggregated sensor value (the localized sensor value) that corresponds to sample window 255. In one example, sample window re-aggregation component 233 can obtain the sample values for samples 2 and 3 (in FIG. 4A-1) and provide them to aggregation system 216 which aggregates the sample values for sensor samples 2 and 3 to obtain the localized aggregated sensor value for sample window 255. In another example, sample window re-aggregation component 233, itself, aggregates the value of samples 2 and 3 to obtain a localized aggregated sensor value for sample window 255. Thus, sample localization system 219 can obtain an aggregated sensor value for a geographic area (or sample window) 255 that is localized within the geographic area 253 corresponding to the aggregated sensor value A.

Action signal generator 230 can then generate an action signal based upon the corrected sensor value and/or the localized sensor value. Action signal generator 230 can generate a signal to store the corrected and/or localized sensor value in data store 192. Action signal generator 230 can also generate an output to control system 152 which can be used to generate control signals to control the controllable systems 198 based on the corrected and/or localized values. Control system 152 can generate a control signal to control communication system 232 to communicate the corrected and/or localized value to other machines 184, other systems 186 (which may, for instance include cloud systems such as a mapping system or other systems), etc. Control signal generator 152 can generate control signals to control operator interface mechanisms 96 to surface the corrected and/or localized value (e.g., display the corrected and/or localized value) to operator 92 along with the magnitude of any correction that has been applied, and along with any other information that is desirable. Planting control system 154 can generate control signals to control planting system 234 based on the corrected sample and/or localized value. For instance, planting control system 154 can generate control signals to control downforce actuators to control the downforce or upforce applied to a row unit 106 based upon the corrected and/or localized sensor value. Planting control system 154 can generate control signals to control seed metering system, the seed delivery system, or any of a wide variety of other controllable mechanisms in planting system 234.

Machine application control system 113 can generate control signals to control machine application systems 236 based upon the action signal output by action signal generator 230. For instance, material application control system 113 can control the valves or other actuators 109, to control the timing and quantity of application of material based upon the corrected and/or localized sensor value. Lookahead planting control system 550 can generate control signals to predictively control controllable systems 198, such as to level a planting machine, to control the rate of seed delivery, etc., based on the corrected and/or localized sensor value. Tillage control system 155 can generate control signals to control tillage systems 237 based on the corrected and/or localized sensor values, such as to control tillage depth, soil distribution, etc. Control system 152 can also generate other control signals to control other machine systems 238 and other items 240 based upon the action signal generated by action signal generator 230 (which itself is based on the corrected and/or localized sensor value). By way of example, control system 152 can generate control signals to control the propulsion system of the towing vehicle, the steering system of the towing vehicle, or any of a wide variety of other machine systems 238.

Figure 5A:
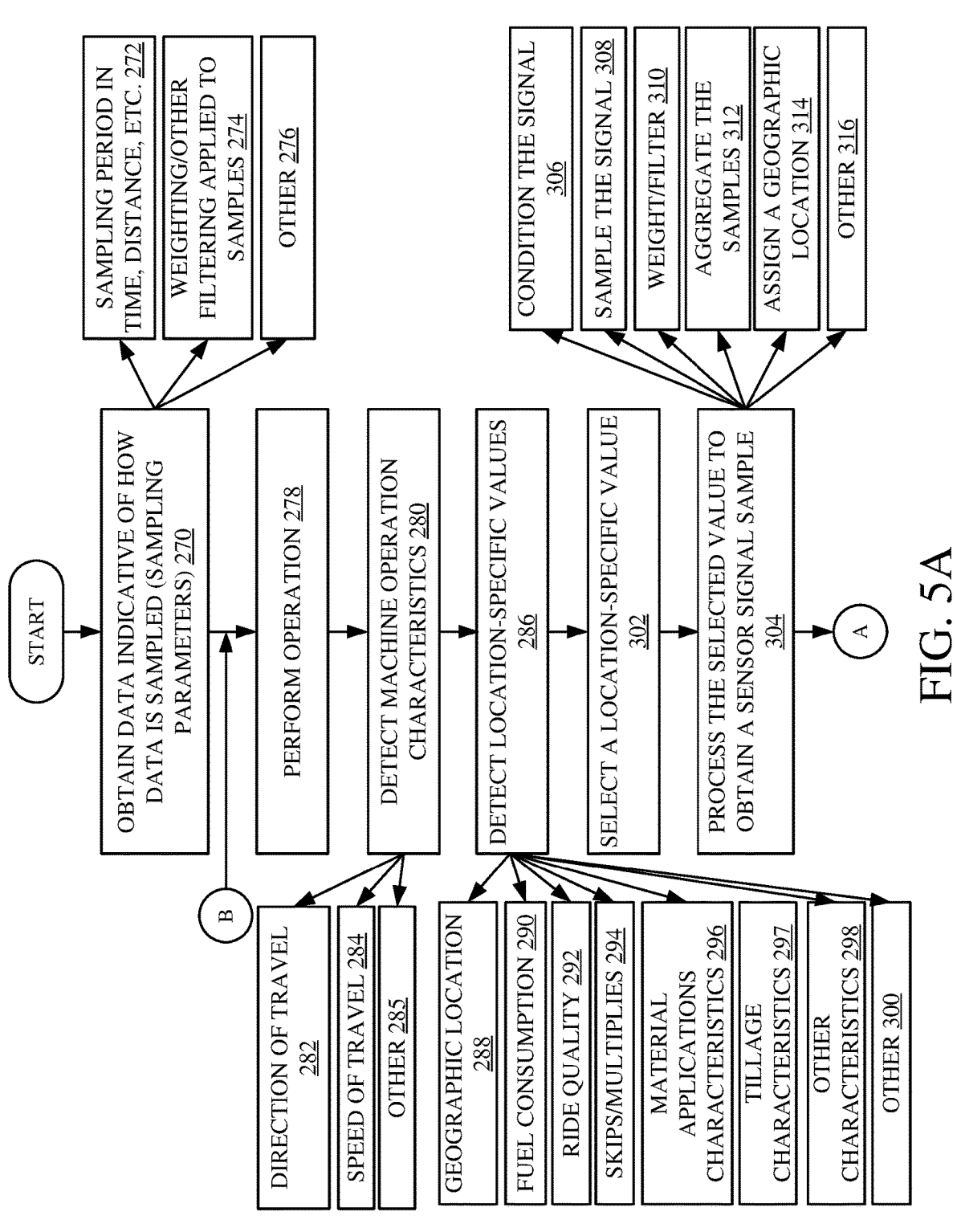
FIGS. 5A and 5B (collectively referred to herein as FIG. 5) show a flow diagram illustrating one example of the operation of an agricultural system.
Figure 5B:
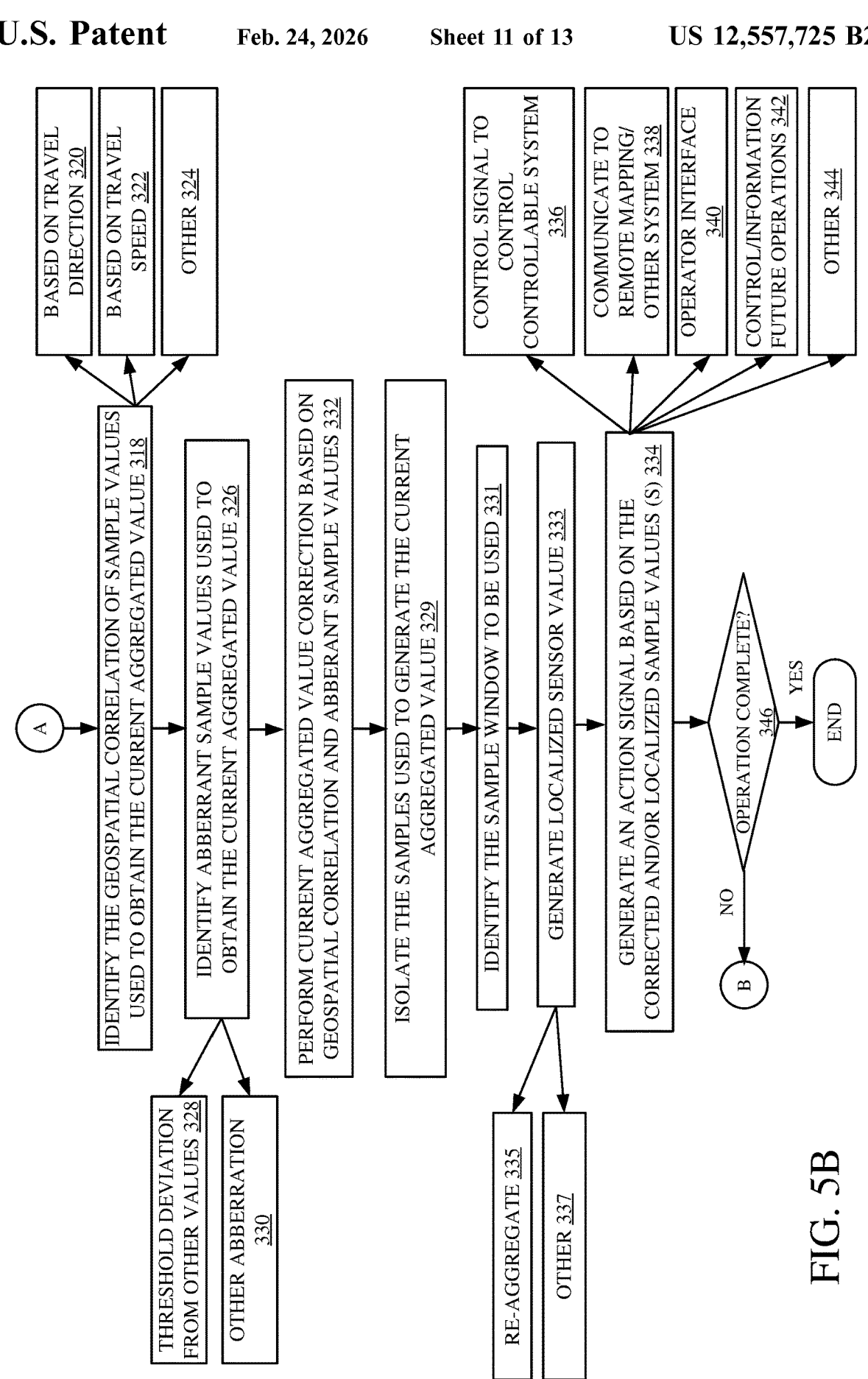

FIGS. 5A and 5B (collectively referred to has FIG. 5) show a flow diagram illustrating one example of the operation of agricultural system 182. It is first assumed that signal processor 196 obtains data indicative of how the data from sensors 194 is to be sampled. This data can be referred to as the sampling parameters. Obtaining the sampling parameters is indicated by block 270 in the flow diagram of FIG. 5. The sampling parameters may be stored in data store 192 or received as an input to signal processor 196 in other ways. The sampling parameters may include the sampling period (in terms of time or distance, etc.) as indicated by block 272 in the flow diagram of FIG. 5. The sampling parameters may include any weighting or other filtering that is applied to the samples, as indicated by block 274, or any of a wide variety of other parameters that indicate how the data is sampled, as indicated by block 276.

The planting machine then begins to perform an operation (planting, tillage, material application, etc.), as indicated by block 278 in the flow diagram of FIG. 5. Signal processor 196 then detects machine operation characteristics, as indicated by block 280. Such characteristics can include, for instance, the direction of travel of the machine, as indicated by block 282, and the travel speed of the machine, as indicated by block 284. Signal processor 196 then detects location-specific values (represented by the values of the sensor signals generated by sensors 194). Detecting location-specific values is indicated by block 286 in the flow diagram of FIG. 5. There are a wide variety of different location-specific values that can be detected, some of which are described elsewhere herein and some of which may include the geographic location or position generated by position sensor 202, as indicated by block 288, fuel consumption 290, ride quality 292, the detection of seed skips or multiples as indicated by block 294, material application characteristics generated by material application characteristic sensors 206 as indicated by block 296, tillage characteristics 297 generated by tillage characteristic sensor(s) 207, or any of a wide variety of other characteristics 298 (parameters, characteristics, conditions, etc.), or other items 300. The sensors generate signals responsive to the sensed parameters, characteristics, conditions, etc.

Signal processor 196 can process the signals from sensors 194 simultaneously (e.g., in parallel) or serially. For purposes of the present discussion, it will be assumed that signal processor 196 processes one of the location-specific values generated by sensors 194 at a time. This discussion is provided for the sake of clarity only, and it is just one example. It will be understood that processing the sensor signals in groups, or in other ways, is contemplated herein as well.

Therefore, signal processor 196 selects a signal value to be processed, as indicated by block 302 in the flow diagram of FIG. 5. Signal processor 196 then processes the selected signal, as indicated by block 304. For instance, signal conditioning system 211 conditions the signal (such as by normalizing it, linearizing it, amplifying it, etc.), as indicated by block 306. Sampling system 212 then obtains a sample value from the signal as indicated by block 308 and weighting/filtering system 214 performs any desired weighting or filtering of that sample, as indicated by block 310. Aggregation system 216 aggregates samples (such as by adding them together, averaging them, etc.) as indicated by block 312 to obtain an aggregated sensor value and sample geospatial correlation system 217 assigns the aggregated sensor value to a geographic location within the field, as indicated by block 314. Signal processor 196 can process the signal in other ways as well, as indicated by block 316.

The present discussion proceeds with respect to the aggregated sensor values being corrected for aberrant sample values and the aggregated sensor values being processed to generate a sensor value that is localized to a geographic location within the geographic location represented by the aggregated sensor value. It will be appreciated that the aggregated senor value can be processed to either correct it or to obtain a localized sample value, but both correction and localization are described with respect to FIG. 5 for the sake of example only.

Therefore, correction system 218 analyzes the aggregated sensor value in order to perform any desired correction on that aggregated value. Geospatial comparison component 222 analyzes the geographic location corresponding to each of the samples used in generating the aggregated sensor value, to identify a relationship between those geographic locations. For instance, if the planting machine is traveling along a route 252 (shown in FIG. 4A), then geospatial comparison component 222 will identify the fact that the geographic location corresponding to the first sample used in generating the aggregated sensor value is furthest away from the geographic location that is assigned to the aggregated sensor value (which would correspond to a geographic location near aggregated sensor value A in FIG. 4A). However, if the planting machine has made a headland turn as shown in FIG. 4B, then geospatial comparison component 222 will identify that the geographic locations corresponding to the first sample and the aggregated sensor value A are relatively close to one another. These are just examples of the different relationships that can be identified by geospatial comparison component 222. Identifying the geospatial correlation of sample values used to obtain the aggregated sensor value under analysis is indicated by block 318 in the flow diagram of FIG. 5. The correlation can be generated based on the direction of travel 320 of the planting machine and the speed of travel 322, and based on a wide variety of other items 324.

Sample aberration identification component 224 identifies any aberrant sample values that were used to obtain the aggregated sensor value under analysis, as indicated by block 326 in the flow diagram of FIG. 5. As discussed above, component 224 can identify aberrant sample values by comparing the sample values to threshold values. The threshold values may be based upon the other values used to generate the aggregated sensor value under analysis, or the threshold values can be obtained in other ways. Identifying aberrant values by comparing them to threshold values is indicated by block 328 in the flow diagram of FIG. 5. Aberrations can be identified in other ways as well, as indicated by block 330.

Sample correction component 226 then performs correction on the current aggregated sensor value under analysis based upon the geospatial correlation and the aberrant sample values that were used to make up the aggregated sensor value. Performing correction is indicated by block 332 in the flow diagram of FIG. 5. The correction can be performed in any of a wide variety of different ways. For instance, the aberrant value can be replaced in the calculation of the aggregated sensor value by some of the other samples that are used to make up the aggregated sensor value. In another example, the aberrant value can be removed from the calculation or replaced by a default value or another value.

Sample localization system 219 performs localization to identify a sample corresponding to a geographic area that is within the geographic area corresponding to the current aggregated sample under analysis. For instance, sample isolation component 229 isolates the samples that were used to generate the current aggregated sensor value under analysis, as indicated by block 329 in the flow diagram of FIG. 5. By way of example, sample isolation component 229 can identify the geographic location corresponding to each of the samples that were used in generating the current aggregated sensor value under analysis. Referring, for instance, to FIG. 4A-1, sample isolation component 229 identifies each of the samples 1-8 and the corresponding geographic location of each of the samples 1-8 along route 252.

Sample window identification component 231 then identifies the sample window for which a new, localized sensor value is to be generated. For instance, referring again to FIG. 4A-1, sample window identification component 231 identifies sample window 255 as being the geographic area for which a new, localized sample is to be generated, within the geographic area 253 corresponding to the current aggregated sensor value under analysis. Identifying the sample window to be used is indicated by block 331 in the flow diagram of FIG. 5. The sample window can be identified based upon an operator input or another user input, such as by a diagnostics display or otherwise. The sample window may be identified based upon an input from another automated or semi-automated system that desires to obtain a localized sensor value for the identified sample window 255, in addition to, or instead of, the current aggregated sensor value for the sample window 253.

Sample window re-aggregation component 233 then obtains the samples corresponding to the identified sample window (e.g., samples 2 and 3 in sample window 255 in FIG. 4A-1) and re-aggregates those values (e.g., averages them, weights them, or performs another type of aggregation) to obtain the localized sensor value corresponding to the identified sample window 255. Generating the localized sensor value is indicated by block 333 in the flow diagram of FIG. 5. Re-aggregating the samples within the identified sample window to generate the localized value is indicated by block 335. It will be noted that the localized sensor value can be generated in other ways as well, as indicated by block 337.

The type of aggregation used to generate the localized sensor value may be specified by the user or system requesting the localized value. The localized sensor value may be generated using the same type of aggregation (albeit using fewer samples) used by aggregation system 216, or a different algorithm that may be stored in data store 192, or input in other ways.

Action signal generator 230 then generates an action signal based upon the corrected and/or localized sensor values, as indicated by block 334. Action signal generator 230 can generate an output to control system 152 so control system 152 can generate control signals to control controllable systems 198, as indicated by block 336. Communication system 232 can be controlled to communicate the corrected aggregated sensor value and/or the localized sensor values to remote mapping systems or other systems 186, as indicated by block 338. Operator interface mechanism 96 can be controlled to surface the corrected and/or localized sensor value to operator 92 along with any other desirable information, as indicated by block 340. Other controllable systems 198 can be controlled, and the information can be stored in data store 192 or output to other machines 184 and used to control or inform future operations, as indicated by block 342. Other action signals can be generated as well, as indicated by block 344. Until the operation is complete, as indicated by block 346, processing reverts to block 278 where the machine continues to perform the operation and samples are continuously or intermittently detected and corrected and/or localized.

It can thus be seen that the present description describes a system that can be used to back out individual samples that are used to generate an aggregated sample of a sensor signal. The backed out samples can be analyzed to determine whether there are any aberrant values, and to determine how close those aberrant values were taken in time, or distance, to the geographic location assigned to the aggregated value. The aggregated value can then be corrected. The backed out samples can also be used to generate a localized value that is localized to a geographic location (or time) that is different from the geographic location (or time) assigned to the aggregated value. An action signal is generated based upon the corrected and/or localized value.

The present discussion has mentioned processors, processing systems, controllers and/or servers. In one example, these can include computer processors with associated memory and timing circuitry, not separately shown. The processors, processing systems, controllers, and/or servers are functional parts of the systems or devices to which they belong and are activated by, and facilitate the functionality of the other components or items in those systems.

Also, a number of user interface displays (UIs) have been discussed. The UIs can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, sensors, and/or logic. It will be appreciated that such systems, components, sensors, and/or logic can be comprised of hardware items (such as processors and associated memory, or other processing components, some of which are described below) that perform the functions associated with those systems, components, sensors, and/or logic. In addition, the systems, components, sensors, and/or logic can be comprised of software that is loaded into a memory and is subsequently executed by a processor or server, or other computing component, as described below. The systems, components, sensors and/or logic can also be comprised of different combinations of hardware, software, firmware, etc., some examples of which are described below. These are only some examples of different structures that can be used to form the systems, components, sensors, and/or logic described above. Other structures can be used as well.

Figure 6:
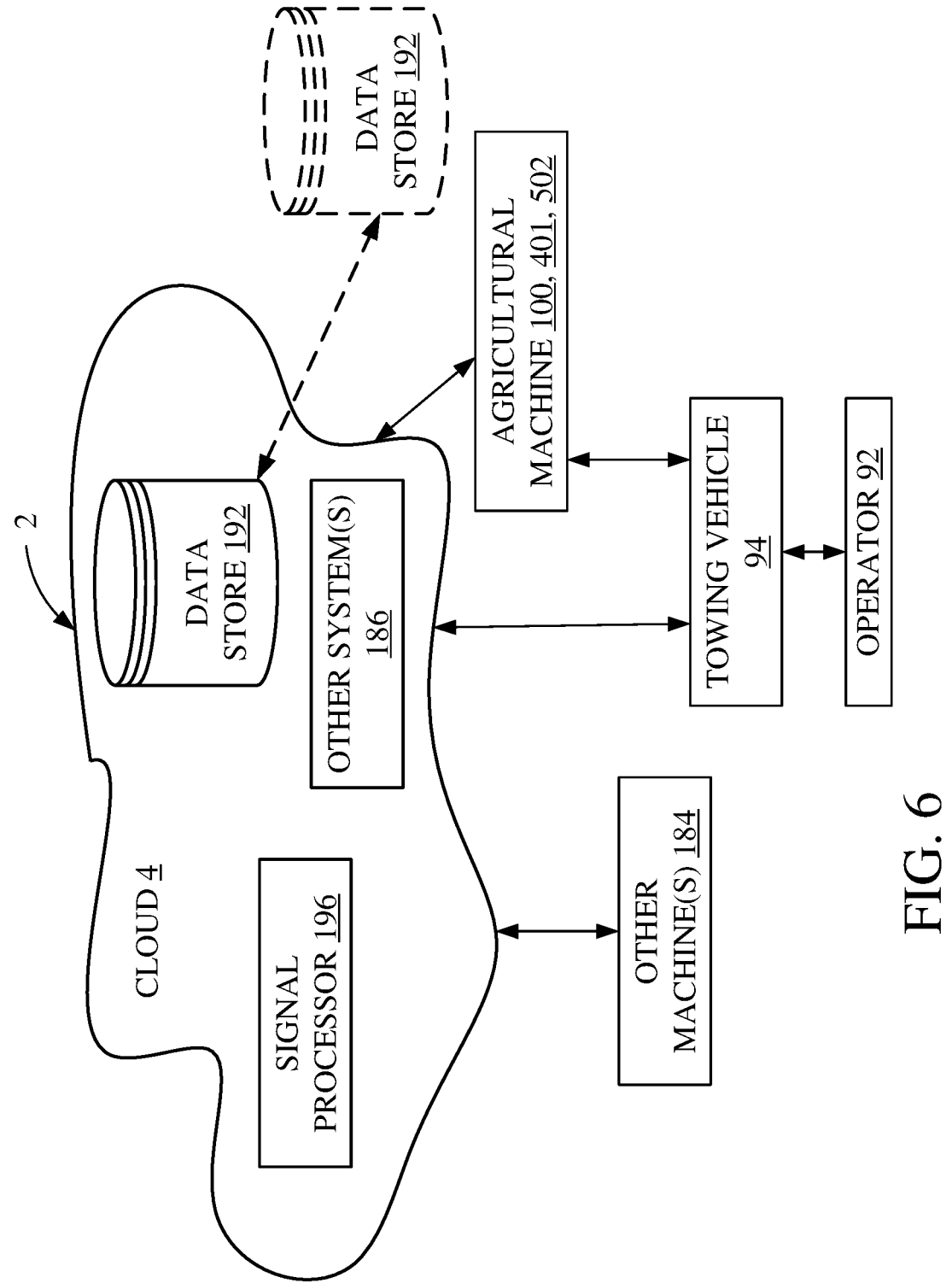
FIG. 6 is a block diagram showing one example of the agricultural system illustrated in FIG. 3, deployed in a remote server architecture.

FIG. 6 is a block diagram of one example of the agricultural machine architectures, shown in FIGS. 1 and 3, where agricultural machine 100, 401, 502, and/or towing vehicle 94 communicates with elements in a remote server architecture 2. In an example, remote server architecture 2 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1 and 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIGS. 1 and 3 and they are similarly numbered. FIG. 6 specifically shows that signal processor 196 and other systems 186 and data store 192 can be located at a remote server location 4. Therefore, agricultural machine 100, 401, 502, and/or towing vehicle 94 access those systems through remote server location 4.

FIG. 6 also depicts another example of a remote server architecture. FIG. 6 shows that it is also contemplated that some elements of FIGS. 1 and 3 are disposed at remote server location 4 while others are not. By way of example, data store 192 can be disposed at a location separate from location 4, and accessed through the remote server at location 4.

Regardless of where the items in FIG. 6 are located, they can be accessed directly by agricultural machines 100, 401, 502, 94, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIGS. 1 and 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
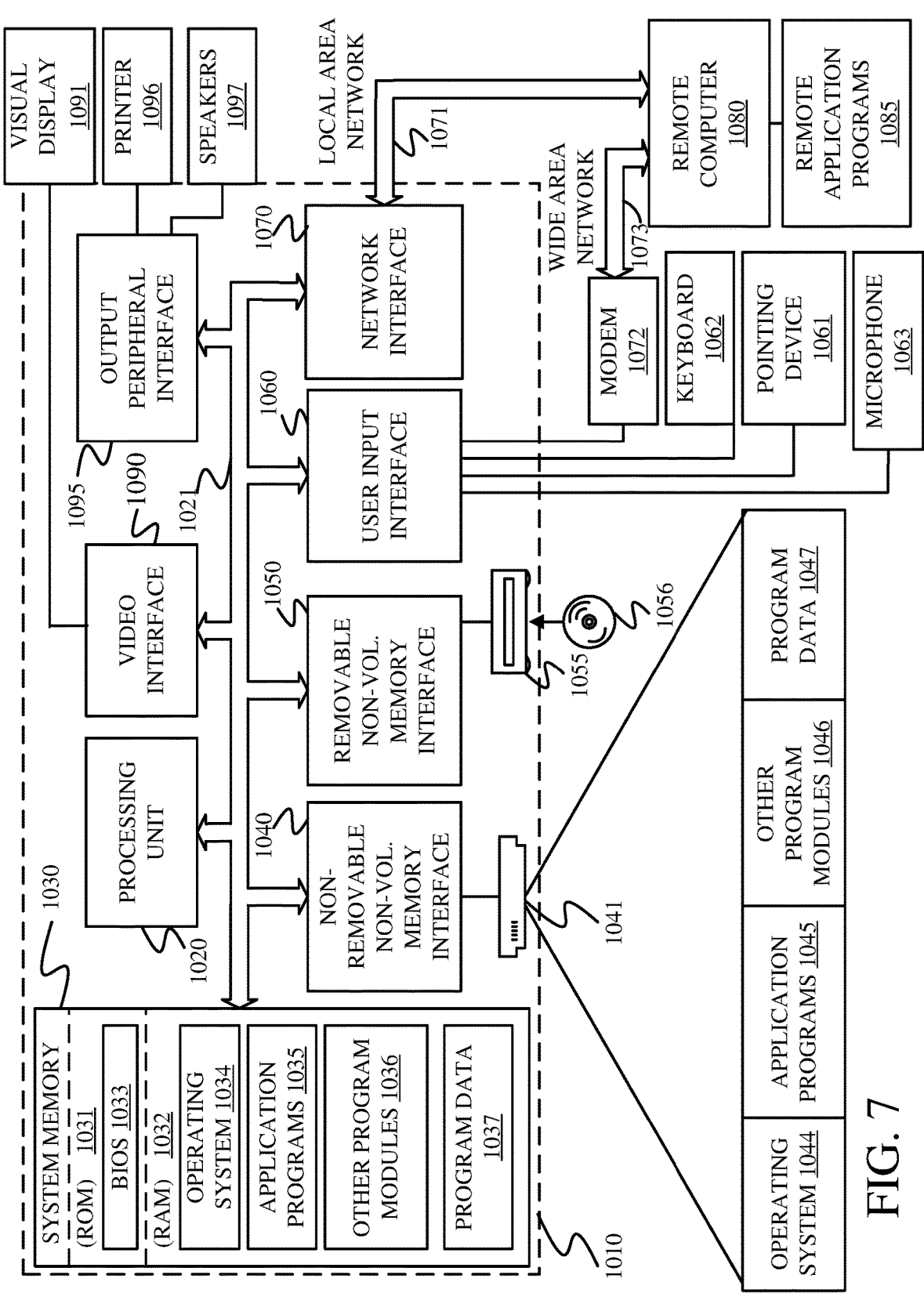
FIG. 7 is a block diagram showing one example of a computing environment that can be used in the architectures shown in the previous figures.

FIG. 7 is one example of a computing environment in which elements of FIGS. 1 and 3, or parts of it, (for example) can be deployed. With reference to FIG. 7, an example system for implementing some examples includes a computing device in the form of a computer 1010 programmed to operate as described above. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIGS. 1 and 3 can be deployed in corresponding portions of FIG. 15.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 7 illustrates operating system 1034, application programs 1035, other program modules 1036, and program data 1037.

The computer 1010 may also include other removable/non-removable volatile/nonvolatile computer storage media. By way of example only, FIG. 7 illustrates a hard disk drive 1041 that reads from or writes to non-removable, nonvolatile magnetic media, an optical disk drive 1055, and non-volatile optical disk 1056. The hard disk drive 1041 is typically connected to the system bus 1021 through a non-removable memory interface such as interface 1040, and optical disk drive 1055 is typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 1010. In FIG. 7, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network—WAN, or a controller area network—CAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 20 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
a sensor sensing a characteristic of an agricultural operation performed by an agricultural machine and generating a sensor signal responsive to the sensed characteristic;
a signal processor that aggregates a first plurality of samples of the sensor signal to obtain a first aggregated signal value;
a sample geospatial correlation system identifying a first geographic location corresponding to the first aggregated signal value;
a sample localization system that generates a localized signal value based on a subset of the first plurality of samples, the sample geospatial correlation system identifying a second geographic location corresponding to the localized signal value; and an action signal generator that generates an action signal based on the localized signal value, wherein the sample geospatial correlation system is configured to identify, as the first geographic location, a first geographic area over which the sensor signal was generated to obtain the first plurality of samples and to identify, as the second geographic location, a second geographic area over which the sensor signal was generated to obtain the subset of the plurality of samples.

2. The agricultural system of claim 1 wherein the sample geospatial correlation system is configured to identify the second geographic area corresponding to the localized signal value as a geographic area within the first geographic area.

3. The agricultural system of claim 2 wherein the sample localization system comprises:
a sample isolation component that identifies a geographic location corresponding to each of the first plurality of samples.

4. The agricultural system of claim 3 wherein the sample localization system comprises:
a sample window identification system configured to obtain a window indicator identifying a localized sample window and identify, as the subset of the first plurality of samples, a set of samples corresponding to the identified localized sample window.

5. The agricultural system of claim 4 wherein the signal processor is configured to aggregate the set of samples corresponding to the identified localized sample window to obtain the localized signal value.

6. The agricultural system of claim 1 and further comprising:
a correction system that identifies a sample, of the plurality of samples, as an aberrant value and corrects the first aggregated signal value based on the aberrant value to obtain a corrected signal value.

7. The agricultural system of claim 6 wherein the correction system comprises:
a geospatial comparison component that compares a geographic location corresponding to each sample of the plurality of samples to geographic locations corresponding to other samples of the plurality of samples to identify geographic correlations among the plurality of samples, wherein the correction system corrects the first aggregated signal value based on the geographic correlations.

8. The agricultural system of claim 6 wherein the correction system comprises:
a sample aberration identification component that identifies the sample as an aberrant sample by comparing a value of the sample to a threshold value and identifying the sample as an aberrant sample based on the comparison.

9. The agricultural system of claim 2 and further comprising:
a control system that receives the action signal and controls the agricultural machine to perform the agricultural operation based on the action signal.

10. The agricultural system of claim 9, wherein the control system is configured to control performance of the agricultural operation based on the localized signal value.

11. The agricultural system of claim 9, wherein
the agricultural machine comprises at least one of:
a planting machine;
a material application machine; or
a tilling machine; and
the characteristic comprises at least one of:
a planting characteristic;

a material application characteristic; or a tillage characteristic.

12. A computer implemented method of controlling an agricultural system, comprising:

generating a sensor signal responsive to a variable of an agricultural operation performed by an agricultural machine;

combining a plurality of samples of the sensor signal to obtain a combined signal value;

comparing a value of a sample, of the plurality of samples, to a threshold value;

identifying the sample as an erroneous value based on the comparison;

correcting the combined signal value based on the erroneous value to obtain a corrected signal value;

identifying a first geographic location corresponding to the corrected signal value;

generating a second signal value based on a subset of the plurality of samples;

identifying a second geographic location corresponding to the second signal value; and controlling the agricultural machine based on the second signal value.

13. The computer implemented method of claim 12 wherein identifying the first geographic location comprises:

identifying, as the first geographic location, a first geographic area over which the sensor signal was generated to obtain the plurality of samples and wherein identifying a second geographic location comprises identifying, as the second geographic location, a second geographic area over which the sensor signal was generated to obtain the subset of the plurality of samples.

14. The computer implemented method of claim 13 wherein identifying the second geographic area comprises:

identifying a localized sample window corresponding to the second signal value as a geographic area within the first geographic area.

15. The computer implemented method of claim 14 wherein generating the second signal value comprises:

identifying a geographic location corresponding to each of the first plurality of samples.

16. The computer implemented method of claim 15 wherein generating the second signal value comprises:

identifying, as the subset of the plurality of samples, a set of samples corresponding to the identified localized sample window; and combining the set of samples corresponding to the identified localized sample window to obtain the second signal value.

17. The computer implemented method of claim 5 wherein correcting the combined signal value comprises:

comparing a geographic location corresponding to each sample of the plurality of samples to geographic locations corresponding to other samples of the plurality of samples to identify geographic correlations among the plurality of samples; and correcting the combined signal value based on the geographic correlations.

18. An agricultural system, comprising:

at least one computer processor; and memory storing computer executable instructions which, when executed by the at least one computer processor, causes the at least one computer processor to perform steps, comprising:

receiving a sensor signal indicative of a sensed characteristic of an agricultural operation;

aggregating a plurality of samples of the sensor signal to obtain an aggregated signal value;

comparing a value of a sample, of the plurality of samples, to a threshold value;

identifying the sample, of the plurality of samples, as an aberrant value based on the comparison;

correcting the aggregated signal value based on the aberrant value to obtain a corrected signal value; and controlling an agricultural machine based on the corrected signal value.

19. The agricultural system of claim 18 and further comprising:

identifying a first geographic location corresponding to the aggregated signal value;

generating a signal value responsive to a subset of the plurality of samples;

identifying a second geographic location corresponding to the signal value generated responsive to the subset of the plurality of samples; and generating a control signal to control the agricultural operation based on the signal value that is generated responsive to the subset of the plurality of samples and based on the second geographic location.

20. The agricultural system of claim 19 and further comprising:

comparing a geographic location corresponding to each sample of the plurality of samples to geographic locations corresponding to other samples of the plurality of samples to identify geographic correlations among the plurality of samples, wherein correcting the aggregated signal value comprises correcting the aggregated signal value based on the geographic correlations.

* * * * *